United States Patent
Futaki et al.

(10) Patent No.: US 10,638,454 B2
(45) Date of Patent: *Apr. 28, 2020

(54) WIRELESS COMMUNICATION SYSTEM, COMMUNICATION CONTROL METHOD, RADIO BASE STATION, RADIO TERMINAL, AND STORAGE MEDIUM

(71) Applicant: NEC CORPORATION, Tokyo (JP)

(72) Inventors: Hisashi Futaki, Tokyo (JP); Jinsock Lee, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,851

(22) Filed: May 22, 2018

(65) Prior Publication Data

US 2018/0270793 A1    Sep. 20, 2018

Related U.S. Application Data

(63) Continuation of application No. 15/395,352, filed on Dec. 30, 2016, now abandoned, which is a
(Continued)

(30) Foreign Application Priority Data

Dec. 26, 2008 (JP) .................................. 2008-335209

(51) Int. Cl.
*H04W 72/00* (2009.01)
*H04W 72/04* (2009.01)
(Continued)

(52) U.S. Cl.
CPC ..... *H04W 72/005* (2013.01); *H04W 72/0426* (2013.01); *H04W 72/0446* (2013.01);
(Continued)

(58) Field of Classification Search
CPC .......... H04W 72/005; H04W 72/0426; H04W 72/0446; H04W 72/0453; H04W 72/042; H04W 68/00; H04W 84/045
See application file for complete search history.

(56) References Cited

U.S. PATENT DOCUMENTS 8,249,007 B2 * 8/2012 Jading .................. H04J 11/0093
370/329
9,497,731 B2    11/2016 Shindo et al.
(Continued)

FOREIGN PATENT DOCUMENTS

JP    2001-218245 A    8/2001
JP    2003124872 A    4/2003
(Continued)

OTHER PUBLICATIONS

Communication dated Aug. 8, 2017 issued by the Japanese Patent Office in counterpart application No. 2016-151164.
(Continued)

*Primary Examiner* — Habte Mered
(74) *Attorney, Agent, or Firm* — Sughrue Mion, PLLC

(57) ABSTRACT

Even when a radio terminal cannot receive contents data from a serving base station, the radio terminal can receive the contents data from other base station. A wireless communication system includes a radio terminal, a serving radio base station to which the radio terminal serves, and a non-serving radio base station to which the radio terminal does not serve. The serving radio base station receives, from the non-serving radio base station, contents-related information concerning contents data to be broadcasted or multicasted by said non-serving radio base station, and transmits the received contents-related information to the radio terminal.

9 Claims, 24 Drawing Sheets

Related U.S. Application Data continuation of application No. 13/142,210, filed as application No. PCT/JP2009/007251 on Dec. 25, 2009, now Pat. No. 9,585,142.

(51) Int. Cl.
*H04W 68/00* (2009.01)
*H04W 84/04* (2009.01)

(52) U.S. Cl.
CPC ........ *H04W 72/0453* (2013.01); *H04W 68/00* (2013.01); *H04W 72/042* (2013.01); *H04W 84/045* (2013.01)

(56) References Cited

U.S. PATENT DOCUMENTS

| | | | | |
|---|---|---|---|---|
| 2005/0090278 | A1* | 4/2005 | Jeong | H04W 36/0055 455/525 |
| 2009/0016254 | A1* | 1/2009 | Lee | H04W 72/005 370/312 |
| 2009/0132675 | A1 | 5/2009 | Horn et al. | |
| 2010/0027471 | A1 | 2/2010 | Palanki et al. | |
| 2010/0048216 | A1 | 2/2010 | Sundarraman et al. | |
| 2010/0069089 | A1 | 3/2010 | Wang | |
| 2010/0113030 | A1* | 5/2010 | Kanazawa | H04J 11/0093 455/437 |
| 2010/0189027 | A1* | 7/2010 | Ishida | H04W 48/12 370/312 |
| 2010/0272004 | A1 | 10/2010 | Maeda et al. | |
| 2011/0085488 | A1* | 4/2011 | Widegren | H04W 72/005 370/312 |
| 2012/0083261 | A1 | 4/2012 | Hui et al. | |

FOREIGN PATENT DOCUMENTS

| | | | |
|---|---|---|---|
| JP | 2003189354 | A | 7/2003 |
| JP | 2004023314 | A | 1/2004 |
| JP | 2007533246 | A | 11/2007 |
| JP | 2007-329758 | A | 12/2007 |
| JP | 2008048236 | A | 2/2008 |
| JP | 200879300 | A | 4/2008 |
| JP | 2009-518994 | A | 5/2009 |
| JP | 2010517334 | A | 5/2010 |
| WO | 2005081459 | A1 | 9/2005 |
| WO | 2007/078164 | A1 | 7/2007 |
| WO | 2008058149 | A2 | 5/2008 |
| WO | 2008099719 | A1 | 8/2008 |
| WO | 2008129812 | A1 | 10/2008 |
| WO | 2008155915 | A1 | 12/2008 |

OTHER PUBLICATIONS

3GPP TS25.346, "Introduction of the Multimedia Broadcast/Multicast Service (MBMS) in the Radio Access Network (RAN); Stage 2," vol. 810, http://www.3gpp.org/ftp/Specs/html-info/25346.htm.

3GPP TS25.820, "3G Home Node B (HNB) Study Item Technical Report," vol. 811, http://www.3gpp.org/ftp/Specs/html-info/25820.htm.

3GPP TS36.300, "Evolved Universal Terrestial Radio Access (E-UTRA) and Evolved Universal Terrestrial Radio Access Network (E-UTRAN); Overall description; Stage 2," vol. 850, http://www.3gpp.org/ftp/Specs/html-info/36300.htm.

Communication dated Apr. 5, 2016 from the Japanese Patent Office in counterpart application No. 2014-199744.

Communication dated Dec. 24, 2013, issued by the Japanese Patent Office in corresponding Application No. 2010-543910.

Communication dated Jun. 9, 2015, issued by the Japanese Patent Office in counterpart Application No. 2014-199744.

Communication dated Sep. 29, 2015, issued by the Japan Patent Office in corresponding Japanese Application No. 2014-199744.

Ericsson, ZTE, Huawei, Signaling of the MBSFN subframe allocation parameter [online], Discussion, Decision, May 2008, 3GPP TSG-RAN WG2 #62, R2-082166, <URL:http://www.3gpp.org/ftp/tsg_ran/WG2_RL2/TSGR2_62/Docs/R2-082166.zip>.

LG Electronics Inc., "Paging a Single Receiver UE for MBMS Dedicated Layer," 3GPP TSG-RAN WG2, Nov. 6, 2006, pp. 1-4, vol. 56.

Communication dated May 8, 2018 from the Japanese Patent Office in counterpart Japanese application No. 2016-151164.

ETSI MCC, "Report of 3GPP TSG RAN WG2 meeting #62bis", Aug. 18-22, 2008, 3 GPP TSG-RAN WG 2#63; R2-083830;URL:http://www.3gpp.org/ftp/tsg_ran/WG2_RL2/TSGR2_63/Docs/R2-083830.zip; Section 5.3.1, 4 pages.

ZTE "Improvement on MBSFN. subframe signalling" [online], 3 GPP TSG-RAN WG 2#63. R2-084564, <URL:http://www.3gpp.org/ftp/tsg_ran/WG2_RL2/TSGR2_63/Docs/R2-084564.zip>, Aug. 18, 2008, pp. 1-5.

Communication dated Sep. 3, 2019 from Japanese Patent Office in counterpart JP Application No. 2018-228153.

\* cited by examiner

WIRELESS COMMUNICATION SYSTEM, COMMUNICATION CONTROL METHOD, RADIO BASE STATION, RADIO TERMINAL, AND STORAGE MEDIUM

CROSS REFERENCE TO RELATED APPLICATIONS

This application is a Continuation of U.S. application Ser. No. 15/395,352 filed Dec. 30, 2016, which is a Continuation of U.S. application Ser. No. 13/142,210 filed Jun. 24, 2011, issued as U.S. Pat. No. 9,585,142, and which is a National Stage of International Application No. PCT/JP2009/007251 filed Dec. 25, 2009, claiming priority based on Japanese Patent Application No. 2008-335209, filed Dec. 26, 2008, the contents of all of which are incorporated herein by reference in their entireties.

TECHNICAL FIELD

The present invention relates to a wireless communication system including plural radio base stations, and a radio terminal that serves to any of the radio base stations and that can communicate with the radio base station, and a communication technique of the wireless communication system.

BACKGROUND ART

In recent years, in a mobile communication network, attention has been focused on a multicast technique in which data are simultaneously distributed only to plural specific radio terminals. In a network called the Universal Mobile Telecommunication System (UMTS) based on the 3GPP (The 3rd Generation Partnership Project), a contents-distributing service called the Multimedia Broadcast and Multicast Service (MBMS) is supported for providing multimedia broadcasting and broadcast services. Further, discussions have been under way so that the Long Term Evolution (LTE) also supports the MBMS (Non-patent Document 1). According to the standard specification of 3GPP, any types of base stations (for example, macro base station and micro base station) can support the MBMS.

The radio terminal can receive multicast signals or broadcast signals of MBMS data regardless of whether the radio terminal is in an active state or an idle state, which means a standby state. Further, at the time when the radio terminal moves to other cells while receiving the MBMS data, the cell reselection, cell update or handover is implemented depending on communication states of the radio terminal. When in the idle state, the radio terminal receives paging information by using a paging channel (PCCH) from a radio base station to which the radio terminal serves, and checks whether any incoming calling exists or not on the basis of the paging information. The term cell reselection refers to an operation that changes a base station (current serving destination to which the radio terminal serves) that transmits the paging information, to the other base station (other serving destination to which the radio terminal serves). When in the active state, the radio terminal establishes synchronization with the base station to which the radio terminal serves to receive and transmit user data. The term handover refers to an operation that changes the base station to which the radio terminal serves, to the other base station, due to the fact that the radio terminal in the active state moves.

In the UMTS and the LTE of 3GPP, in addition to the macro base station, a femto base station (also called "home base station") is defined as an inexpensive, small base station having limited performance (see Non-patent Document 2 and Non-patent Document 3). The general femto base station is a small base station located indoors and connected with the existing broadband line. Through the broadband line, the general femto base station accesses to the communication network to carry out communication.

As related art documents in connection with the 3GPP, Non-patent Documents 1 through 3 listed below are given for example.

RELATED DOCUMENTS

Non-Patent Documents

Non-patent Document 1: 3GPP TS25.346 v810, the Internet <URL:http://www.3gpp.org/ftp/Specs/html-info/25346.htm>

Non-patent Document 2: 3GPP TR25.820 v811, the Internet <URL:http://www.3gpp.org/ftp/Specs/html-info/25820.htm>

Non-patent Document 3: 3GPP TS36.300 v850, the Internet <URL:http://www.3gpp.org/ftp/Specs/html-info/36300.htm>

SUMMARY OF THE INVENTION

In the case where a cell of the femto base station (femto cell) and a cell of the macro base station (macro cell) are overlapped with each other, since in an area of the femto cell, the received quality of signals from the femto base station is better than the received quality of signals from the macro base station, the radio terminal inevitably serves to the femto base station, and does not serve to the macro base station.

When located in the cell of the macro base station that supports the MBMS, and receiving the MBMS data in the idle state, the radio terminal receives signals transmitted from the macro base station via the broadcast control channel (BCCH), the paging control channel (PCCH), a multicast control channel (MCCH), a multicast scheduling channel (MSCH) and a multicast traffic channel (MTCH). In the case where a radio terminal receiving the MBMS data in the macro cell moves to the other macro cell and then serves to the other macro base station, it is possible for the radio terminal to continuously receive the MBMS data via MTCH from a macro base station to which the radio terminal newly serves, if the serving macro base station supports the MBMS.

On the other hand, the femto base station only has limited functions as compared with the macro base station, and hence, it is highly possible that the femto base station does not support the MBMS. In this case, the radio terminal cannot receive the contents-distributing service through the MBMS at the time when the radio terminal executes the cell reselection and moves from the macro cell of the macro base station that supports the MBMS to the femto cell of the femto base station that does not support the MBMS. Therefore, in such a case, the radio terminal determines that it is located in an out-of-service area.

The problem described above is not limited to the case where the radio terminal serves to the femto base station, and may similarly occur in the case of other macro base station that does not support the MBMS, or in the case of other types of small base stations such as a micro base station and a pico base station.

As described above, even when the radio terminal is located in an area of the macro cell of the macro base station that supports the MBMS, the radio terminal cannot receive the multicast signals or the broadcast signals of the MBMS data as described above in the case where the radio terminal serves to the femto base station that does not support the MBMS.

The present invention has been made in view of the facts described above, and an object of the present invention is to provide a wireless communication system, a communication control method, a radio base station, a radio terminal, and a storage medium, which enables the radio terminal to obtain information concerning a contents-distributing service such as MBMS provided from a radio base station to which the radio terminal does not serve.

According to the present invention, there is provided a wireless communication system including a radio terminal, a serving radio base station to which the radio terminal serves, and a non-serving radio base station to which the radio terminal does not serve. In the wireless communication system, the serving radio base station receives, from the non-serving radio base station, contents-related information concerning contents data broadcasted or multicasted by the non-serving radio base station, and transmits the whole or part of the received contents-related information to the radio terminal.

According to the present invention, there is provided a communication control method of a serving radio base station, which is a radio base station to which a radio terminal serves, in a wireless communication system including the radio terminal, the serving radio base station and a non-serving radio base station, which is a radio base station to which the radio terminal does not serve. The communication control method includes: receiving, from the non-serving radio base station, contents-related information concerning contents data broadcasted or multicasted by the non-serving radio base station; and transmitting the whole or part of the received contents-related information to the radio terminal.

According to the present invention, there is provided a radio base station to which a radio terminal serves in a wireless communication system including the radio terminal, the radio base station, and a non-serving radio base station to which the radio terminal does not serve. The radio base station includes a receiving unit that receives, from the non-serving radio base station, contents-related information concerning contents data broadcasted or multicasted by the non-serving radio base station, and a transmitting unit that transmits the whole or part of the received contents-related information to the radio terminal.

According to the present invention, there is provided a radio terminal in a wireless communication system including the radio terminal, a serving radio base station, which is a radio base station to which the radio terminal serves, and a non-serving radio base station, which is a radio base station to which the radio terminal does not serve. The radio terminal issues, to the serving radio base station, a request to transmit contents-related information concerning contents data broadcasted or multicasted by the non-serving radio base station.

Then, according to the present invention, there is provided a storage medium that stores a program for causing a computer to execute a communication control process of a serving radio base station in a wireless communication system including a radio terminal, the serving radio base station, which is a radio base station to which the radio terminal serves, and a non-serving radio base station, which is a radio base station to which the radio terminal does not serve. The communication control process includes: a receiving process that receives, from the non-serving radio base station, contents-related information concerning contents data broadcasted or multicasted by the non-serving radio base station; and a transmitting process that transmits the whole or part of the received contents-related information to the radio terminal.

According to the present invention, the radio terminal can obtain information on whether a neighboring radio base station provides a contents-distributing service.

BRIEF DESCRIPTION OF THE DRAWINGS

The above-described object and other objects of the present invention, and features and advantages of the present invention will be made further clear by the preferred exemplary embodiments described later and the following attached drawings.

DESCRIPTION OF EMBODIMENTS

Figure 1:
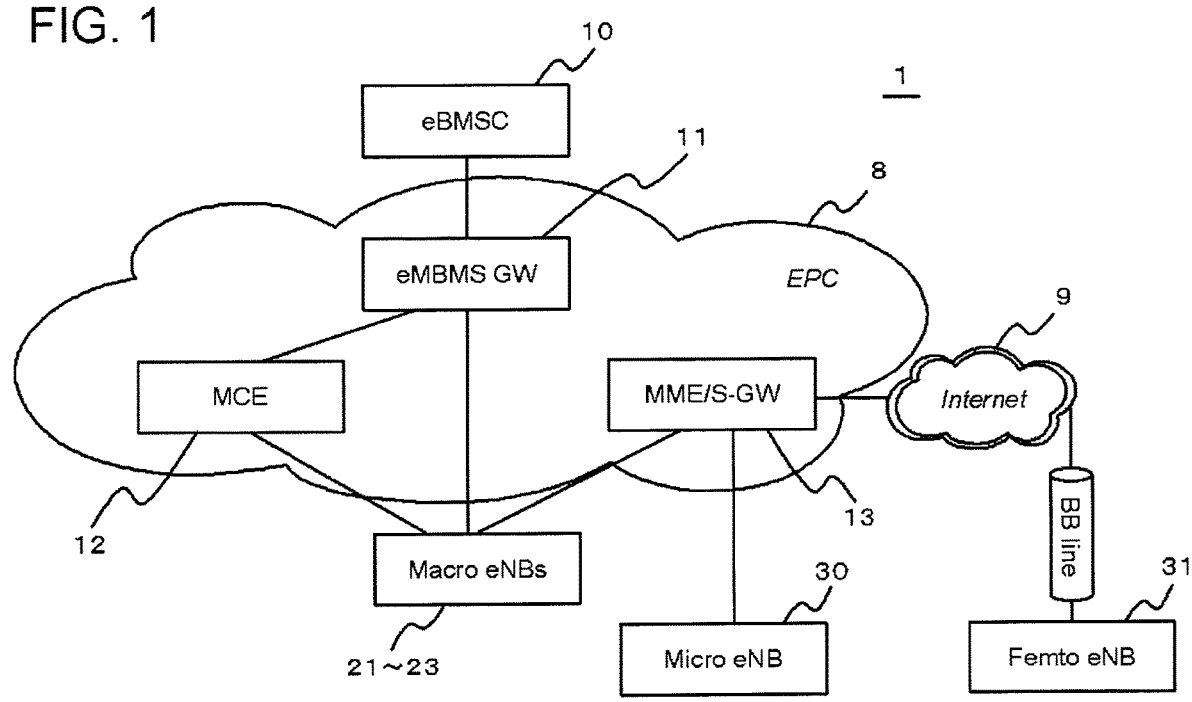
FIG. 1 is a functional block diagram illustrating a schematic configuration of a wireless communication system of one exemplary embodiment according to the present invention.

Hereinbelow, exemplary embodiments according to the present invention will be described with reference to the drawings. Note that, in all the drawings, the same constituent components are denoted with the same reference numerals, and the detailed explanation thereof will not be repeated.

[Schematic Configuration of Wireless Communication System]

Hereinbelow, a wireless communication system (mobile communication system) according to the exemplary embodiment of the present invention will be described. This wireless communication system has a preferred configuration pursuant to the specification of "3GPP Long Term Evolution (3GPP LTE)," but is not limited to that. FIG. 1 is a functional block diagram illustrating one example of a schematic configuration of a wireless communication system 1 according to the exemplary embodiment of the present invention. The wireless communication system 1 includes first radio base stations 21, 22, 23, each of which is a macro base station (macro eNB: macro evolved Node B), and a group of second base stations consists of a micro base station (micro eNB) 30 and a femto base station (femto eNB) 31. The micro base station 30 and the femto base station 31 are small base stations that manage small, local cells (communication areas), whose sizes are different from that of each cell (communication area) of the macro base stations 21, 22, 23. This type of the small base station has a function, for example, of covering an area having the radius range of tens to hundreds of meters.

The macro base stations 21, 22, 23 are connected with a core network (EPC: Evolved Packet Core) 8. The core network 8 is a network integrally accommodating access networks pursuant to various standards (such as "3GPP," "3GPP2," "3GPP LTE" and known wireless LAN standards).

The core network 8 accommodates a MBMS gateway (eMBMS GW: enhanced MBMS Gateway) 11, a multi-cell/multicast control device (MCE: multi-cell/multicast coordination entity) 12 and a terminal mobile management device (MME/S-GW: mobility management entity/serving gateway) 13. A broadcast multicast service center (eBMSC: enhanced broadcast multicast service center) 10 is connected with the core network 8 via the MBMS gateway (eMBMS GW) 11.

On the other hand, an IP network (the Internet) 9 is connected with the terminal mobile management device 13 in the core network 8. The femto base station 31 is connected with the IP network 9 via broadband lines (BB line). The femto base station 31 can receive data from the core network 8 through the IP network 9 and the broadband lines.

Figure 2:
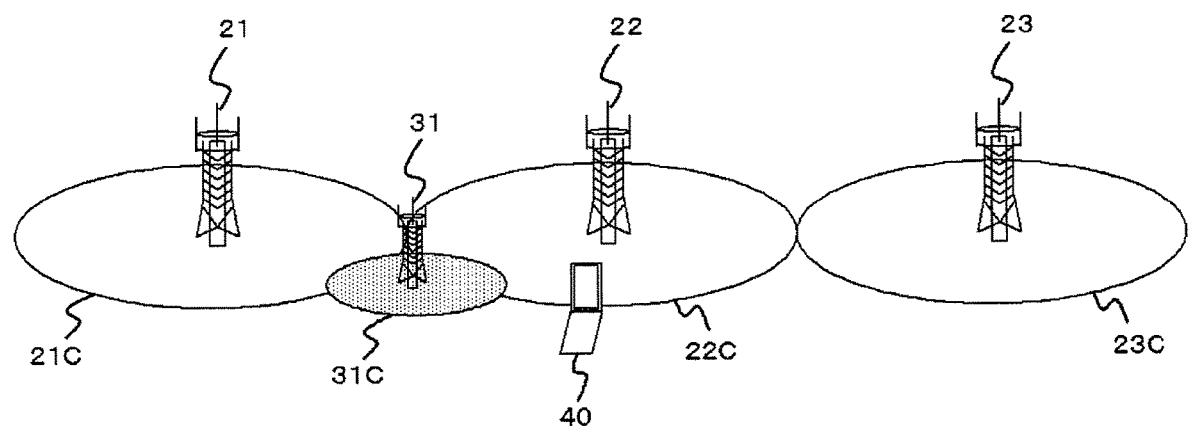
FIG. 2 is a diagram schematically illustrating macro base stations, a femto base station and a radio terminal.
Figure 3:
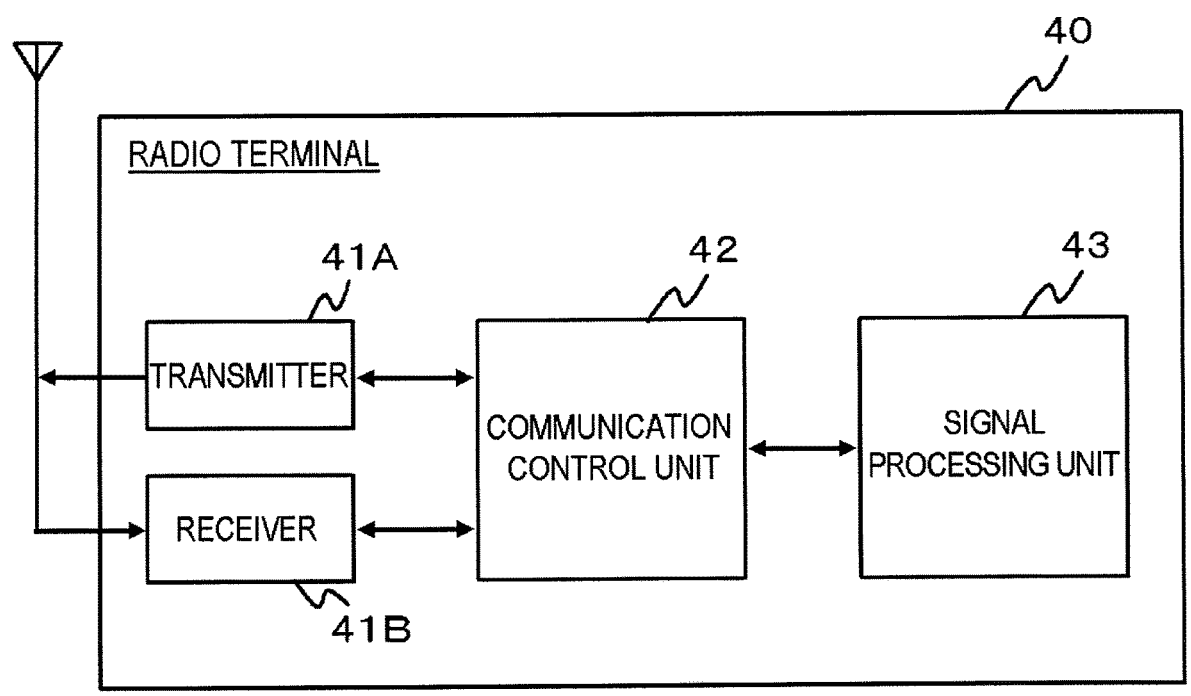
FIG. 3 is a diagram schematically illustrating a configuration of the radio terminal.

FIG. 2 is a diagram schematically illustrating the macro base stations 21, 22 and 23, the femto base station 31 and a radio terminal 40. The whole or part of the area of a femto cell 31C of the femto base station 31 is overlapped with the macro cell of any one of the macro base stations 21, 22 and 23. The radio terminal (UE: User Equipment) 40 such as a mobile terminal serves to any one of the base stations 21, 22, 23 and 31, and has a function of communicating with the base station to which the terminal serves. As illustrated in FIG. 3, the radio terminal 40 has a transmitter 41A, a receiver 41B, a communication control unit 42 and a signal processing unit 43.

Figure 4:
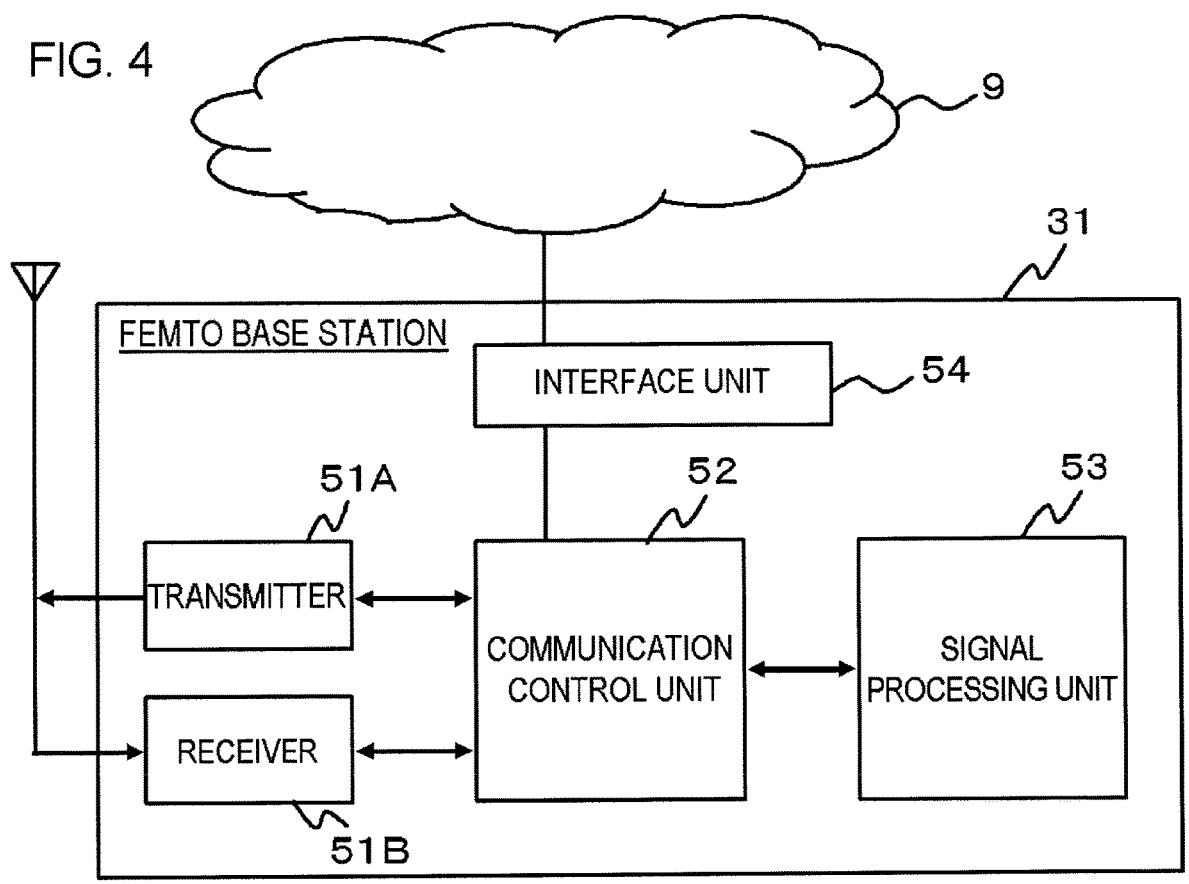
FIG. 4 is a diagram schematically illustrating a configuration of the femto base station.

FIG. 4 is a functional block diagram illustrating a schematic configuration of the femto base station (femto cell base station) 31. As illustrated in FIG. 4, the femto base station 31 has a transmitter 51A, a receiver 51B, a communication control unit 52, a signal processing unit 53 and an interface unit 54. The interface unit 54 is connected with the IP network 9 via the broad band lines or Ethernet (registered trademark) lines, and is further connected with the core network 8 (FIG. 1) via the IP network 9.

The macro base stations 21, 22, 23 have a function of performing the broadcast distribution or multicast distribution of contents data, respectively. The macro base stations 21, 22, 23 have a function of performing the contents distribution by using a MBMS Single Frequency Network (MBSFN) technique in which data of the same contents are simultaneously transmitted with the same frequency band. The radio terminal 40 can receive signals in which the broadcast signals or multicast signals transmitted from the plural macro base stations 21, 22, 23 are combined, whereby it is possible to realize higher received quality as compared with the case of receiving a unicast signal.

The femto base station 31 receives, from the macro base stations 21 to 23, MBMS-related information (contents-related information) concerning the contents data to be broadcasted or multicasted by the macro base stations 21 to 23. The femto base station 31 has a function of transmitting the received MBMS-related information to the radio terminal 40 that serves to the femto base station 31. In response to a transmission request from the radio terminal 40, the femto base station 31 transmits the MBMS-related information.

The MBMS-related information includes, for example, MBMS control information, MBSFN control information, information on radio resource used in MBMS or MBSFN (information concerning time or frequency), and service information transmitted through the MBMS or MBSFN (for example, service type or contents information).

The radio terminal 40 has a function of receiving the contents data broadcasted or multicasted from any one of the macro base stations 21 to 23 by using the MBMS-related information.

For example, when the radio terminal 40 has moved from the macro cell 21C of the macro base station 21 that performs a multicast-type MBMS distribution to the femto cell 31C of the femto base station 31 that does not perform the MBMS distribution, the radio terminal 40 serves to the femto base station 31, and hence, cannot receive the contents data from the femto base station 31. In such a case, as described later, the communication control unit 42 of the radio terminal 40 controls the communication using a gap pattern. The radio terminal 40 can receive the contents data in accordance with the gap pattern. The gap pattern is a periodic pattern including an inactive period in which the radio terminal 40 receives the downlink signal from the base station to which the radio terminal 40 serves, and an active period that excludes the inactive period, and these periods are alternately set by time. The receiver 41B has a function of receiving the contents data from the macro base station 21 within the active period in the gap pattern in accordance with the communication control.

Figure 5:
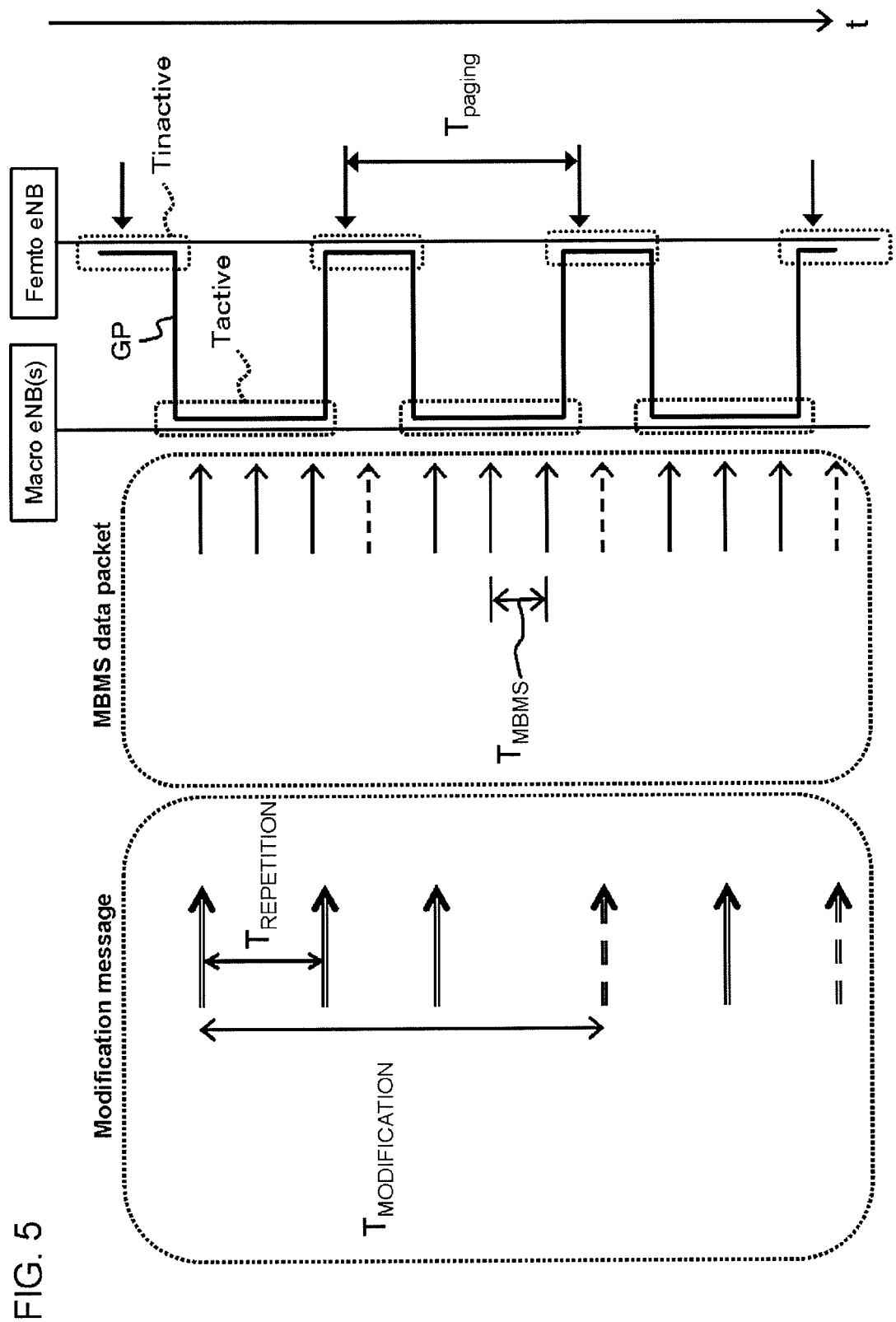
FIG. 5 is a diagram for explaining a gap pattern.

FIG. 5 is a diagram for explaining a gap pattern GP. As illustrated in FIG. 5, the gap pattern GP consists of an inactive period (inactive gap) Tinactive including a period in which the radio terminal 40 should receive a paging message that arrives periodically at intervals of $T_{paging}$ from the femto base station (femto eNB) 31 to which the radio terminal 40 serves, and an active period (active gap) Tactive in which the paging message from the femto base station (femto eNB) 31 may not be required to be received. As illustrated in FIG. 5, the femto base station (femto eNB) 31 receives a MBMS data packet that arrives periodically at intervals of $T_{MBMS}$ during the active period Tactive, and receives a modification message that arrives periodically at intervals of $T_{REPETITION}$ when needed. The femto base station 31 does not receive the MBMS data packet and the modification message during the inactive period Tinactive in the gap pattern GP.

In FIG. 5, the $T_{MODIFICATION}$ means a modification period. The modification message is control information concerning the MBMS transmitted from the macro base station 21 via the MCCH. The modification message is a message for notifying the modification of the MCCH, and the modification period is a cycle at which the modification of the MCCH may occur.

Then, the radio terminal (UE) 40 receives the data by the MBSFN during the active period Tactive as illustrated in FIG. 5 in a similar manner to the time when the radio terminal 40 receives the MBSFN control information and the MBMS data packet from the macro base station 21 before the cell reselection has executed. More specifically, the radio terminal (UE) 40 receives the MBSFN control information via the BCCH and the MCCH, and the MBMS data packet via the MSCH and the MTCH. This enables the radio terminal (UE) 40 in the idle state to continuously receive the service of the MBSFN even after changing its serving destination from the macro base station 21 that supports the MBMS to the femto base station 31 that does not support the MBMS.

However, as illustrated in FIG. 5, the radio terminal 40 cannot always receive all the MBMS data packets during the active period Tactive. This is because the radio terminal 40 needs to preferentially receive data (including paging message) from the femto base station 31 to which the radio base station 40 serves. More specifically, in the idle state (standby for the incoming call), the radio terminal 40 needs to receive a calling signal (paging message) that notifies the presence or absence of the incoming call from the femto base station 31 to which the radio terminal 40 serves.

By using the gap pattern, the radio terminal 40 can continuously receive the MBMS control information and the MBMS data transmitted via the channel (hereinafter, referred to as "MBMS-related channel") used for transmitting the information concerning the MBMS from the macro base stations 21 to 23, even when the radio terminal 40 serves to the femto base station 31.

It should be noted that it is assumed that the base station to which the radio terminal 40 serves is the femto base station 31, and the base stations to which the radio terminal 40 does not serve are macro base stations 21 to 23. When the radio terminal 40 serves to the femto base station 31 or attempts to receive the MBMS data during the radio station 40 serves to the femto base station 31, it is sufficient for the radio terminal 40 to start various operations in the exemplary embodiments described below.

The radio terminal 40 can identify the femto base station 31 by using an identification method based on information (for example, cell type) contained in broadcast information transmitted from the femto base station 31 via the BCCH, and an identification method based on a physical-layer cell ID (physical cell identifier) of the femto base station 31. The latter identification method employs a fact that physical-layer cell IDs used for the macro base stations 21 to 23 can be distinguished from a physical-layer cell ID used for the femto base station.

It should be noted that, in the case of the multicast distribution, the MBMS-related channel includes a broadcast channel (BCCH), a multicast traffic channel (MCCH), a multicast scheduling channel (MSCH), and a multicast control channel (MTCH). The radio terminal 40 can selectively receive signals of these MBMS-related channels per need basis. Note that, in the present specification, the expression "receive the signal via the MBMS-related channel" not only includes generating decoded data by applying a decoding process to the signal transmitted via the MBMS-related channel, but also includes monitoring contents of the decoded data.

It should be noted that the above-described channel names are exemplarily shown on the basis of the definition of a logical channel in the "3GPP LTE," and information transmitted using each of the channels will be shown below.

The information transmitted via the BCCH include: for example, as information (MSAP: MCH subframe allocation pattern) on a radio resource for the MBSFN, information on a subframe of a downlink reserved for the MBSFN (mbsfn-Subframe Configuration); information on a radio frame (radio frame) that should contain the MBSFN subframe (radio frame allocation); and, information on a MBSFN subframe contained in one radio frame (subframe allocation).

Figure 6:
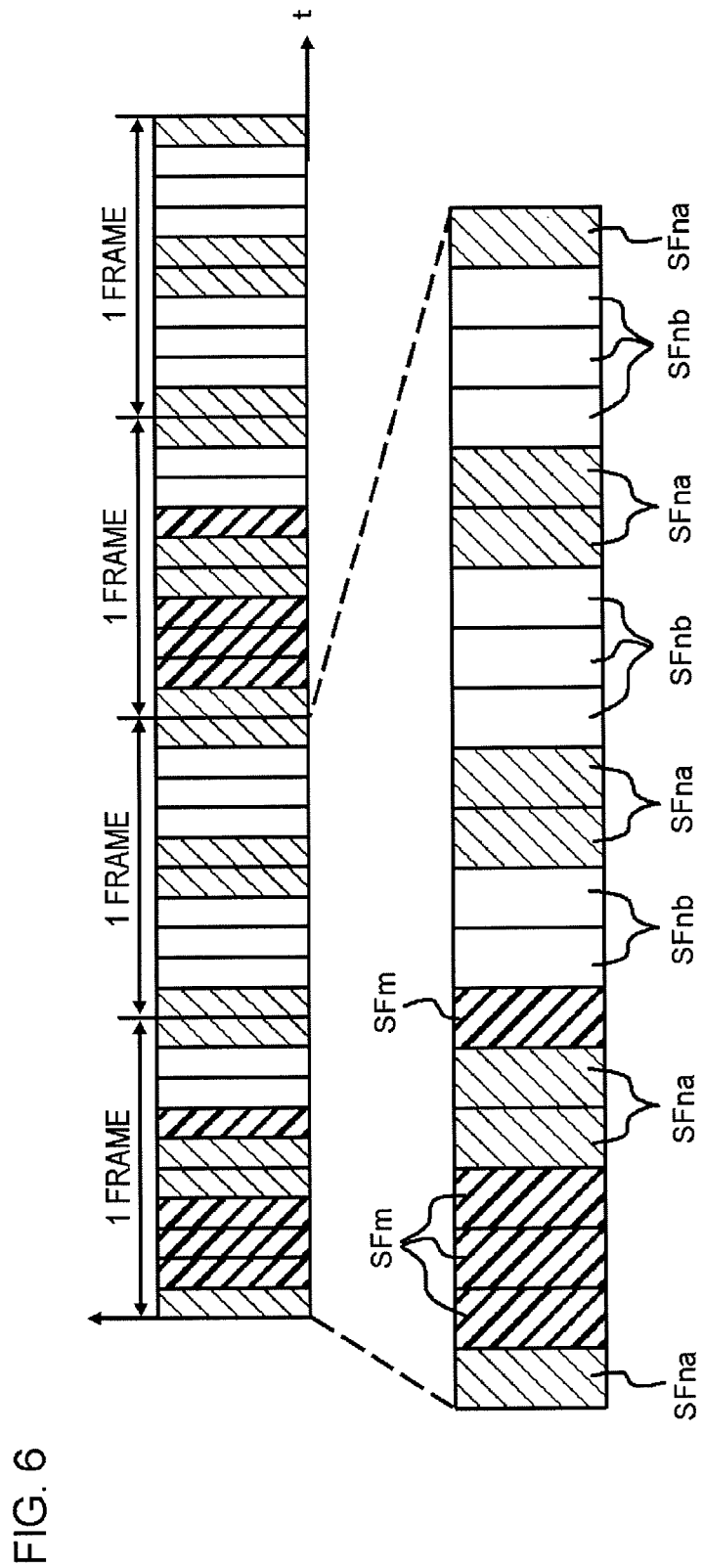
FIG. 6 is a schematic view illustrating an example of a radio frame structure of a downlink.

FIG. 6 is a schematic view illustrating an example of a radio frame structure of a downlink. The length of each radio frame is 10 milliseconds (ms), and each radio frame contains 10 subframes. A subframe SFm in FIG. 6 is a subframe for the MBSFN, and allocation thereof is notified using MSAP information. Further, a subframe SFna is a subframe for general downlink signal transmission, but cannot be used as the subframe for the MBSFN, whereas a subframe SFnb is a subframe for general downlink signal transmission. The MSAP information is information indicating the subframe for the MBSFN in the micro level and the macro level. In this specification, the micro level represents a unit of subframe, and the macro level represents a unit of frame (one frame=10 subframes).

The information transmitted via the MCCH is, for example, information concerning an index or contents data of services by the MBSFN. The information transmitted via the MSCH is, for example, information indicating where each contents data is transmitted within the radio resources indicated by the MSAP. Further, the information transmitted via the MTCH is actual contents data such as voice data and video data. Note that it may be possible to utilize other channels that are similar to the channels described above.

It should be noted that the MBMS-related channel is not limited to the above-described various channels. For example, a channel called MICH (MBMS notification indicator channel) is included in the MBMS-related channel. Further, a multicast control channel (MCCH), a multicast scheduling channel (MSCH) and a multicast traffic channel (MTCH) have the same meanings as the MBMS control channel (MCCH: MBMS control channel), the MBMS scheduling channel, and the MBMS traffic channel, respectively.

Hereinbelow, various exemplary embodiments of the wireless communication system 1 having the configuration described above will be described in detail.

First Exemplary Embodiment

Figure 7:
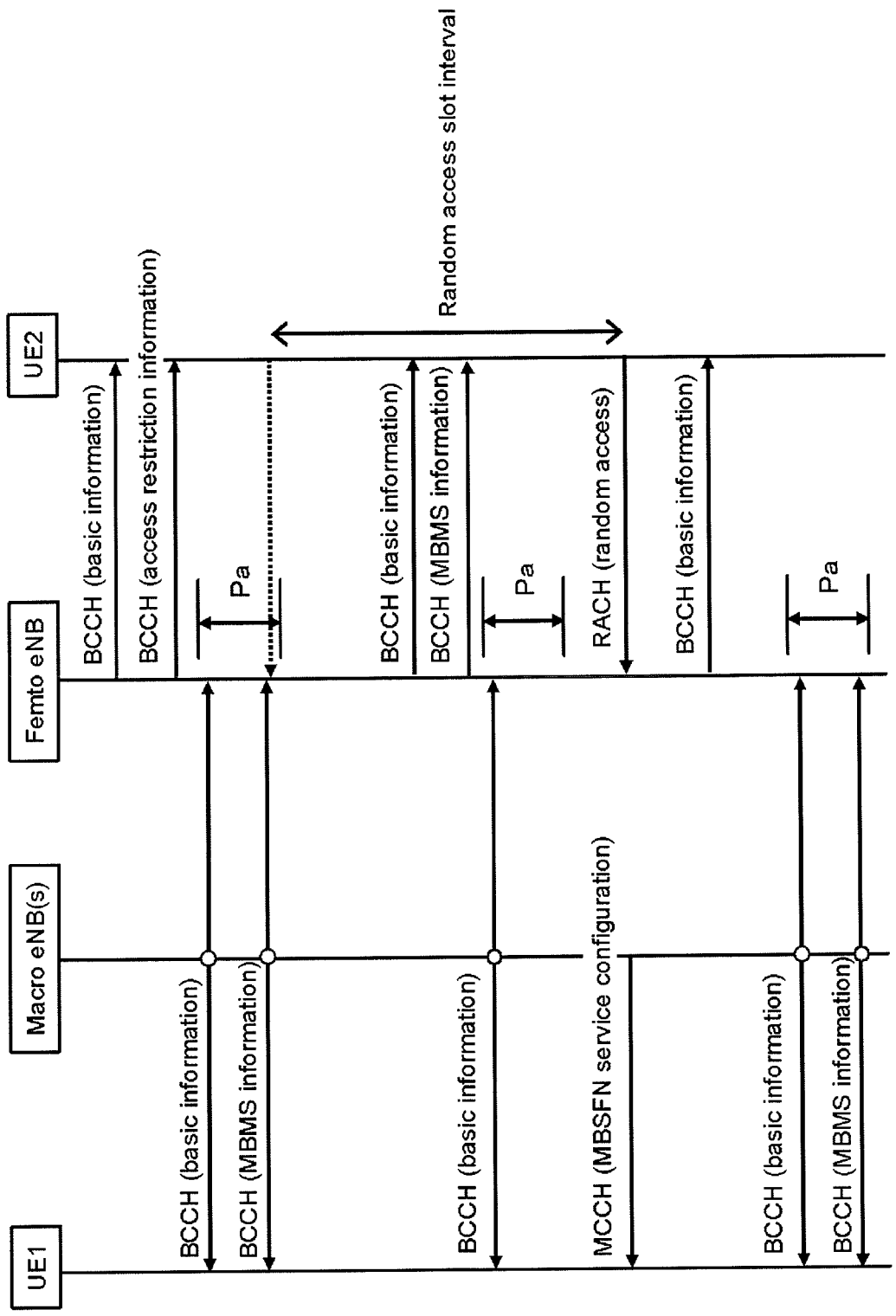
FIG. 7 is a diagram schematically illustrating a communication sequence of a wireless communication system according to a first exemplary embodiment of the present invention.

FIG. 7 is a diagram schematically illustrating a communication sequence of a wireless communication system 1 according to a first exemplary embodiment of the present invention. In the wireless communication system 1 according to this exemplary embodiment, it is assumed that a radio terminal (UE1) serves to a macro base station (macro eNB) 21, and a radio terminal (UE2) 40 serves to a femto base station (femto eNB) 31. As illustrated in FIG. 7, each of the macro base stations (macro eNBs) 21 to 23 transmits, to the radio terminal (UE1) that serves thereto, broadcast information ("basic information" and "MBMS information") via the BCCH. In the case of receiving MBMS data, the radio terminal (UE1) receives and decodes the broadcast information (MBMS information), whereby it is possible to determine, based on the results of the decoding, whether or not the macro base station (macro eNBs) 21 supports the intended MBMS service.

On the other hand, the radio terminal (UE2) 40 serves to the femto base station 31 that does not perform the MBMS distribution, and hence, cannot directly receive the broadcast information (MBMS information) from the macro base station (macro eNBs) 21 to 23 to which the radio terminal (UE2) 40 does not serve.

In view of the fact described above, the femto base station (femto eNB) 31 according to this exemplary embodiment has a function of receiving the broadcast information ("basic information" and "MBMS information") from the macro base stations (macro eNBs) 21 to 23, and of transmitting the whole or part of the MBMS-related information (MBMS information) in the received broadcast information to the radio terminal (UE2) 40. More specifically, the femto base station (femto eNB) 31 generates information concerning an access restriction period Pa that should occur at a predetermined interval or predetermined timing, and notifies the radio terminal existing in its own cell of that information (for example, a configured interval of the access restriction period Pa, or starting time and ending time of the access restriction period Pa) via the BCCH.

In the access restriction period Pa, the femto base station (femto eNB) 31 stops receiving the uplink signal from the radio terminal (UE2) 40. In this case, the radio terminal (UE2) 40 does not transmit any uplink signal to the femto base station (femto eNB) 31 within the access restriction period Pa. Further, during this period, the femto base station (femto eNB) 31 stops transmitting the broadcast information to the radio terminal (UE2) 40.

In parallel with this, the femto base station (femto eNB) 31 receives the broadcast information ("basic information" and "MBMS information") transmitted from the macro base stations (macro eNBs) 21 to 23 via BCCH within the access restriction period Pa.

On the other hand, during a period other than the access restriction period Pa, the femto base station (femto eNB) 31 transmits the broadcast information (basic information) to the radio terminal (UE2) 40 via the BCCH. Further, during the period other than the access restriction period Pa, the radio terminal (UE2) 40 can transmit the uplink signal to the femto base station (femto eNB) 31 in a time slot for random access.

Further, the femto base station (femto eNB) 31 has a function of, in response to a transmission request from the radio terminal (UE2) 40, notifying a radio terminal existing in the cell of the femto base station 31 such as the radio terminal (UE2) 40 of the MBMS-related information (MBMS information) via a shared channel (BCCH). Note that, when the radio terminal (UE2) 40 is in the active state, the femto base station (femto eNB) 31 may transmit the MBMS-related information (MBMS information) to the radio terminal (UE2) 40 via a dedicated channel (DCCH).

Therefore, even when serving to the femto base station (femto eNB) 31, the radio terminal (UE2) 40 can determine, based on the MBMS-related information received from the femto base station (femto eNB) 31, which macro base station of the macro base stations (macro eNBs) 21 to 23 supports the intended MBMS service.

Figure 8:
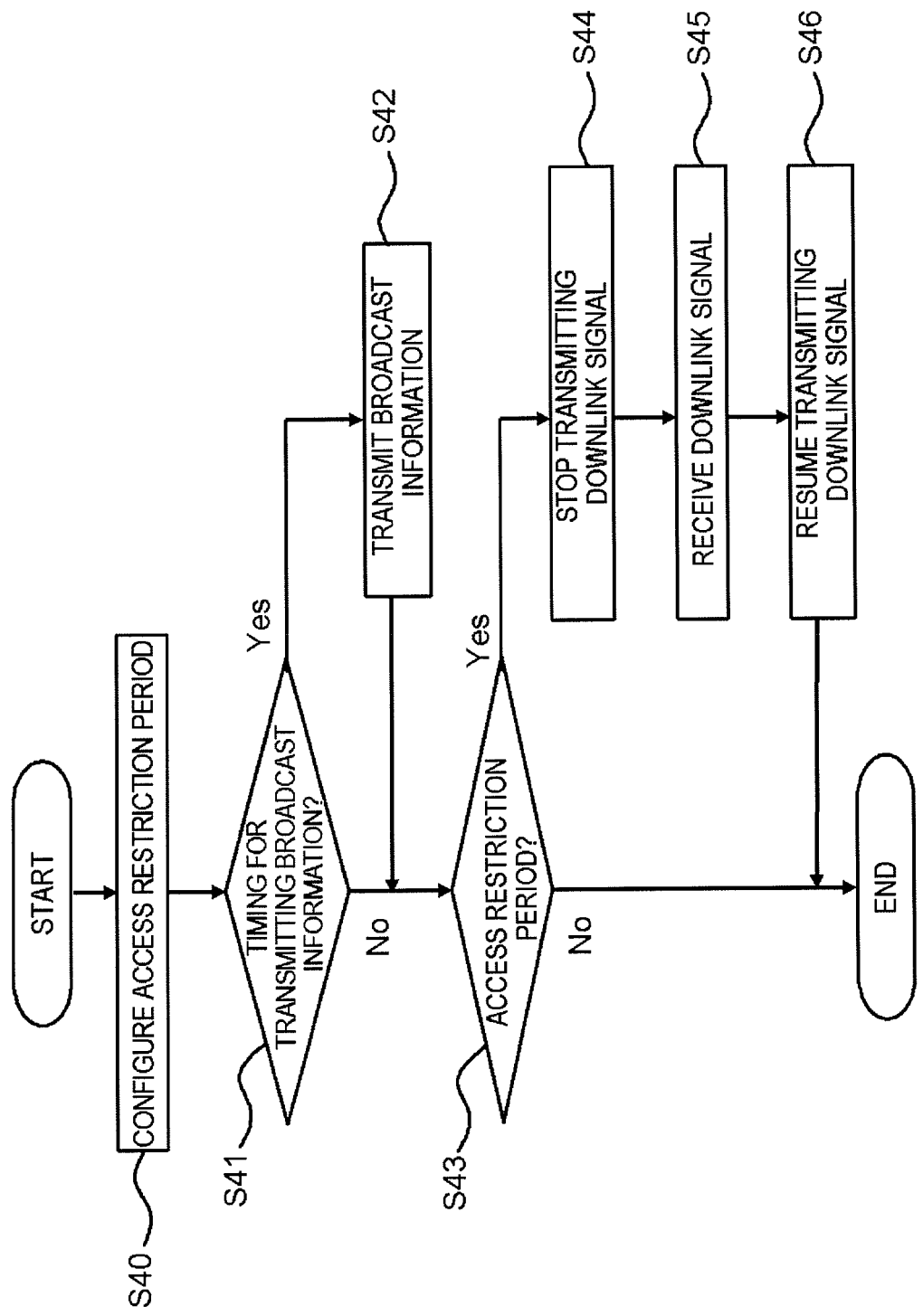
FIG. 8 is a flowchart schematically illustrating an operation procedure of the femto base station.
Figure 9:
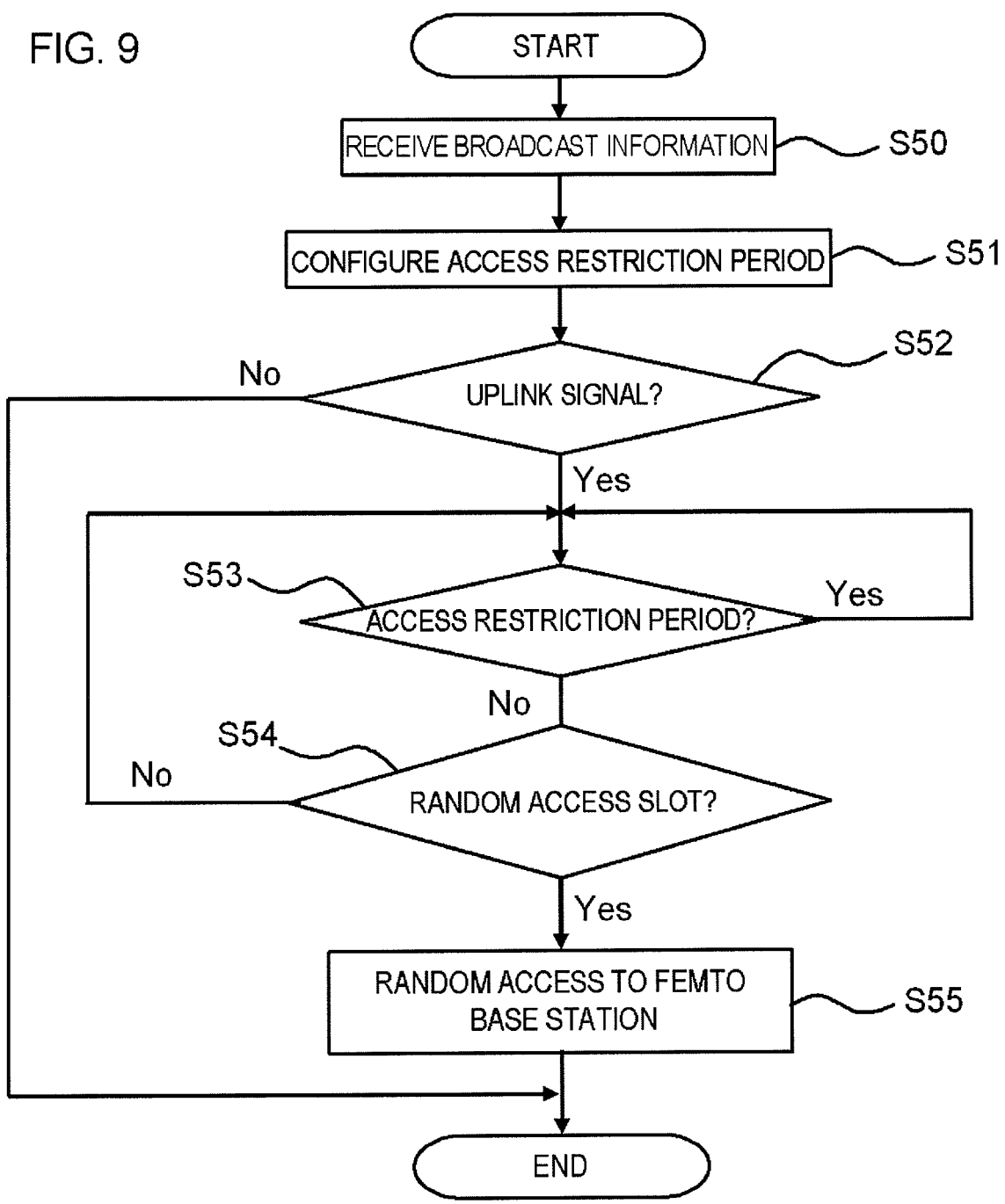
FIG. 9 is a flowchart schematically illustrating an operation procedure of the radio terminal.

Next, operations of the femto base station (femto eNB) 31 and operations of the radio terminal (UE) 40 will be described with reference to FIG. 8 and FIG. 9. FIG. 8 is a flowchart schematically illustrating an operation procedure of the femto base station 31, and FIG. 9 is a flowchart schematically illustrating an operation procedure of the radio terminal 40.

As illustrated in FIG. 8, the communication control unit 52 of the femto base station 31 configures the access restriction period Pa (step S40), and then, determines whether the current time corresponds to the period for transmitting the broadcast information (step S41). If the current time corresponds to the period for transmitting the broadcast information (YES in step S41), the broadcast information (basic information) is broadcasted to the radio terminal existing in the cell of the femto base station via the BCCH (step S42).

On the other hand, if the current time is outside the period for transmitting the broadcast information (NO in step S41), the communication control unit 52 determines whether the current time is in the access restriction period Pa (step S43). If the current time is in the access restriction period Pa (YES in step S43), the communication control unit 52 temporarily stops transmitting the downlink signal to the radio terminal existing in the cell of the femto base station 31 such as the radio terminal (UE2) 40 (step S44). Next, the communication control unit 52 receives the downlink signal (in this exemplary embodiment, broadcast information ("basic information" and "MBMS information") transmitted via the BCCH) from the macro base stations (macro eNBs) 21 to 23 (step S45). Then, the communication control unit 52 resumes transmitting the downlink signal to the radio terminal (UE2) 40 (step S46).

If the current time is outside the access restriction period Pa (NO in step S43), the communication control unit 52 terminates the process. Thereafter, the communication control unit 52 executes the step S40 again if necessary.

Next, operations of the radio terminal (UE2) 40 in the idle state will be described with reference to FIG. 9.

As illustrated in FIG. 9, the radio terminal (UE2) 40 first receives the broadcast information (basic information) from the femto base station 31 via the BCCH (step S50). Next, the communication control unit 42 of the radio terminal (UE2) 40 configures the access restriction period Pa based on the information on the access restriction period notified by the femto base station (femto eNB) 31 (step S51). Further, the communication control unit 42 determines the presence or absence of the uplink signal to be transmitted to the femto base station 31 (step S52).

When there exists the uplink signal to be transmitted to the femto base station 31 (YES in step S52), the communication control unit 42 suspends the random access necessary before transmitting the uplink signal, if the current time is in the access restriction period Pa (YES in step S53). On the other hand, if the current time is outside the access restriction period Pa (NO step S53), it is determined whether the time slot is in the random access slot (slot for the random access channel (RACH)) (step S54). Then, if the time slot is in the random access slot (YES in step S54), the communication control unit 42 executes the random access to the femto base station 31 to transmit the uplink signal (step S55).

If there does not exist the uplink signal to be transmitted to the femto base station 31 (NO in the step S52), the communication control unit 42 terminates the process. Thereafter, the communication control unit 42 executes the step S50 again if necessary.

Figure 10:
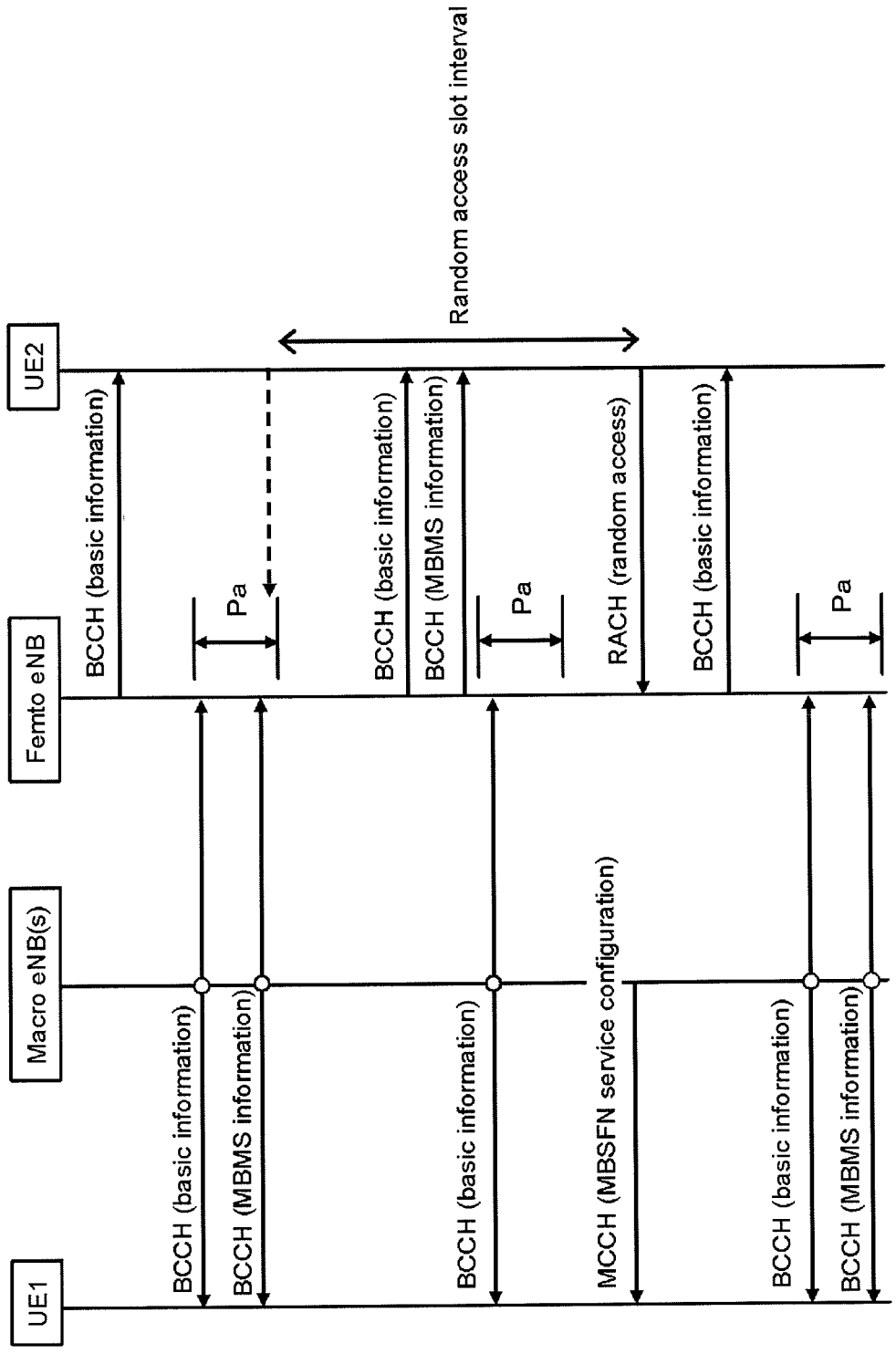
FIG. 10 is a diagram schematically illustrating a communication sequence of a modification example according to the first exemplary embodiment.

FIG. 10 is a diagram schematically illustrating a communication sequence of a modified example of the first exemplary embodiment. In the communication sequence of the modification example, the femto base station (femto eNB) 31 itself configures the access restriction period Pa, but does not notify the radio terminal (UE2) 40 of the information of the access restriction period. Even in the access restriction period Pa, the radio terminal (UE2) 40 attempts, if necessary, to perform the random access to the femto base station (femto eNB) 31 for requesting the transmission of the uplink signal. However, the femto base station (femto eNB) 31 does not receive the uplink signal from the radio terminal (UE2) 40 during the access restriction period Pa, and hence, the radio terminal (UE2) 40 fails to perform the random access. It is only during the period other than the access restriction period that the radio terminal (UE2) 40 succeeds in performing the random access to the femto base station (femto eNB) 31.

In the communication sequence of the modified example, the femto base station (femto eNB) 31 does not need to notify the radio terminal existing in the cell of the femto base station 31 such as the radio terminal (UE2) 40 of the information on the access restriction period Pa, and thus, can flexibly configure the access restriction period per need basis.

Second Exemplary Embodiment

Figure 11:
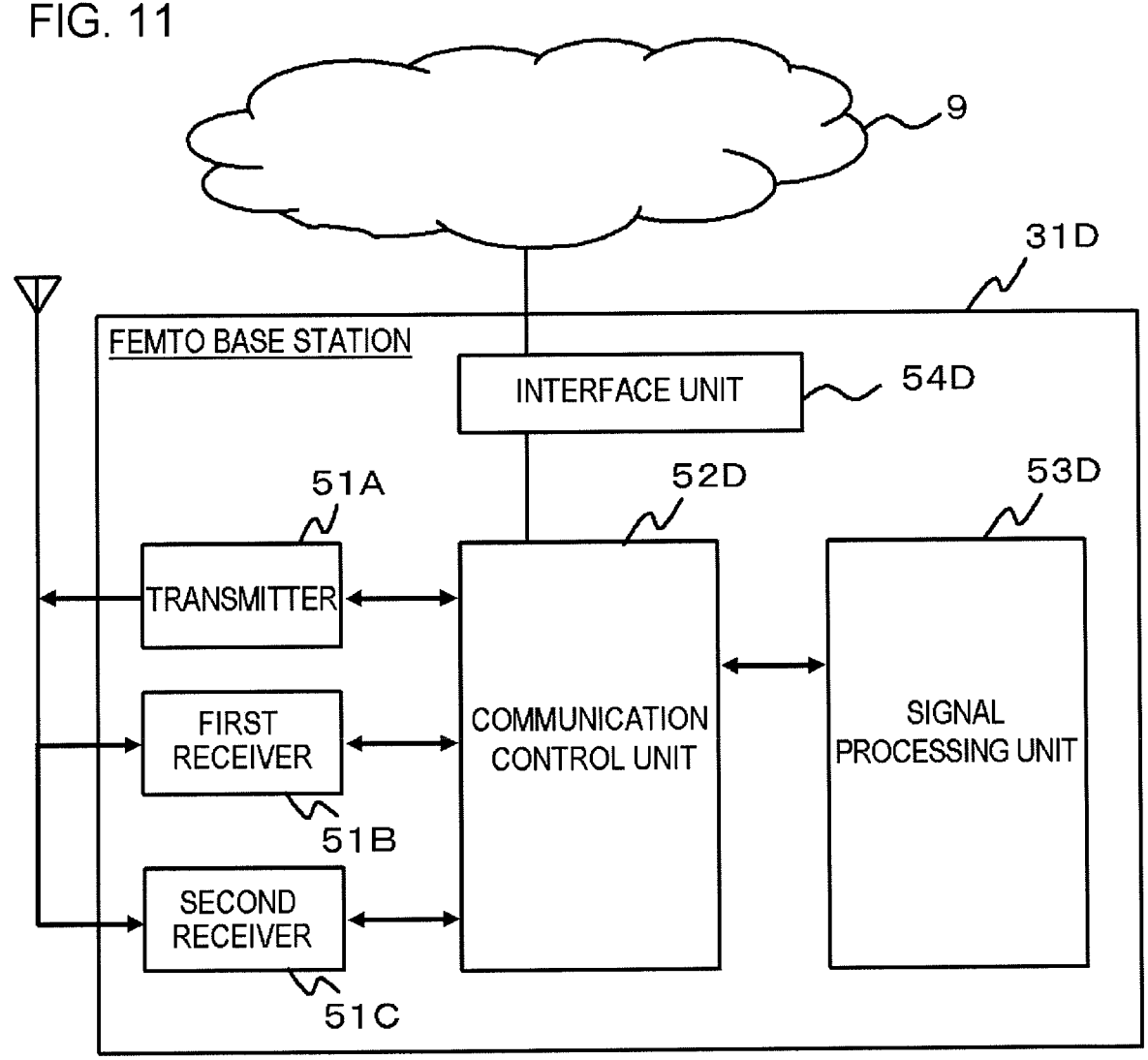
FIG. 11 is a diagram schematically illustrating a configuration of the femto base station.

Next, a second exemplary embodiment according to the present invention will be described. In this exemplary embodiment, a femto base station 31D shown in FIG. 11 is used in place of the femto base station (femto eNB) 31 shown in FIG. 4. As illustrated in FIG. 11, the femto base station 31D has a configuration different from the femto base station 31 shown in FIG. 4 in that the femto base station 31D has two receivers (dual-receiver) 51B, 51C, a communication control unit 52D corresponding to the receivers, and a signal processing unit 53D. In the first exemplary embodiment, the femto base station 31 uses the access restriction period to receive the broadcast information ("basis information" and "MBMS information") transmitted via the BCCH. However, in the second exemplary embodiment, the femto base station 31 uses the two receivers 51B and 51C to receive the broadcast information ("basis information" and "MBMS information").

Figure 12:
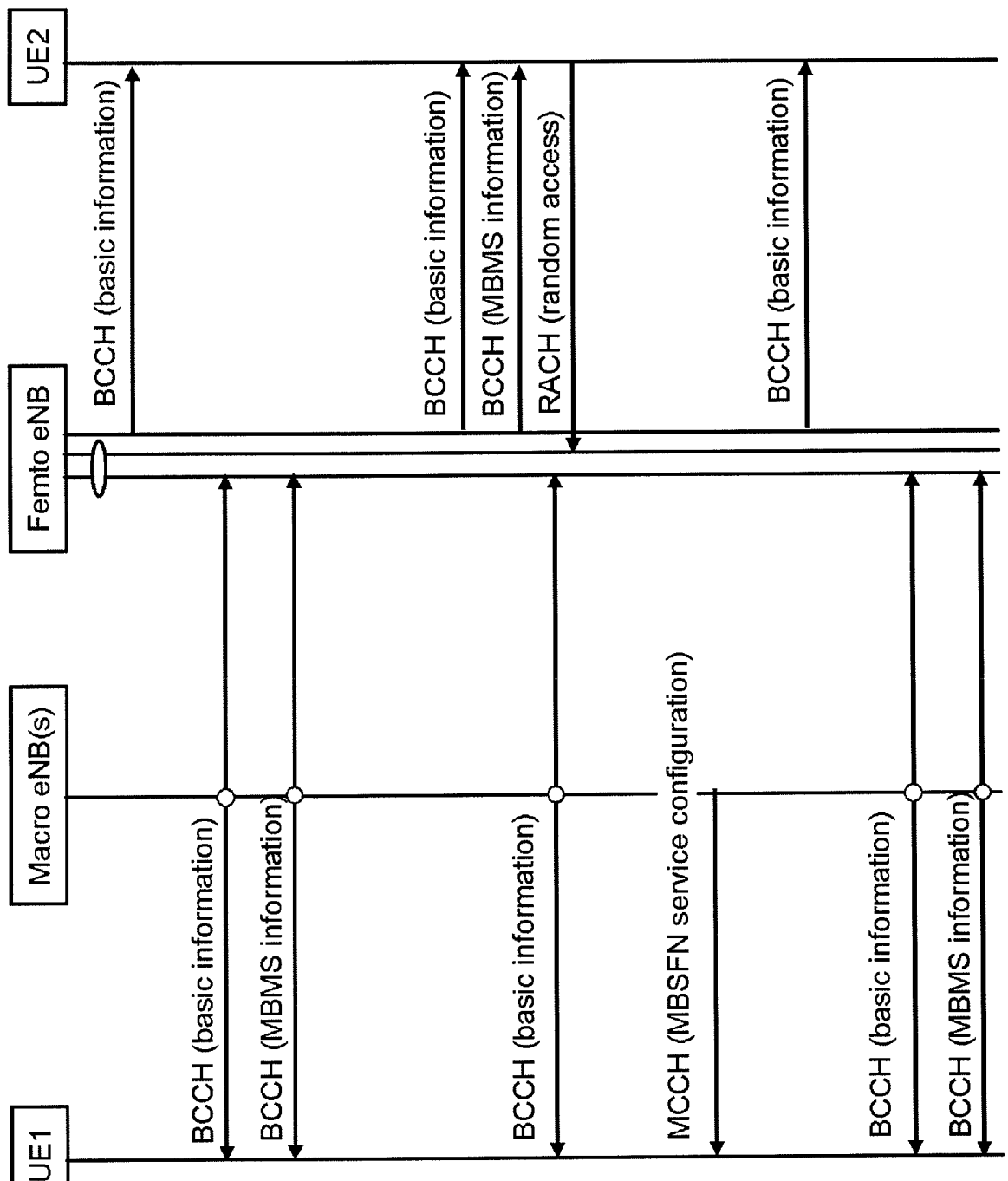
FIG. 12 is a diagram schematically illustrating a communication sequence of a wireless communication system according to a second exemplary embodiment of the present invention.

FIG. 12 is a diagram schematically illustrating a communication sequence of the wireless communication system 1 according to the second exemplary embodiment. In the wireless communication system 1 according to the second exemplary embodiment, it is assumed that the radio terminal (UE1) serves to the macro base station (macro eNB) 21, and the radio terminal (UE2) 40 serves to the femto base station (femto eNB) 31. As is the case with the first exemplary embodiment, the macro base stations (macro eNBs) 21 to 23 transmit the broadcast information ("basis information" and "MBMS information") to the radio terminal (UE1) that serves to the macro base station via the BCCH, as illustrated in FIG. 12. The radio terminal (UE1) receives and decodes the broadcast information, and can determine, on the basis of the decoding results, whether the macro base station (macro eNBs) 21 supports the intended MBMS service.

On the other hand, the radio terminal (UE2) 40 serves to the femto base station 31 that does not perform the MBMS distribution, and thus, cannot receive the broadcast information (MBMS information) directly from the macro base stations (macro eNBs) 21 to 23, to which the radio terminal does not serve.

In view of the facts described above, the femto base station (femto eNB) 31 according to this exemplary embodiment has a function of receiving the broadcast information ("basis information" and "MBMS information") transmitted via the BCCH from each of the macro base stations (macro eNBs) 21 to 23 by using the second receiver 51C, and transmitting the whole or part of the MBMS-related information (MBMS information) of the broadcast information to the radio terminal (UE2) 40 via the BCCH or DCCH. Further, the femto base station (femto eNB) 31 has a function of, in parallel with receiving the broadcast information, receiving the uplink signal (for example, signal of the random access) from the radio terminal (UE2) 40 by using the first receiver 51B. Therefore, in this exemplary embodiment, it is not necessary to configure the access restriction period, which is configured in the first exemplary embodiment.

Similar to the case of the first exemplary embodiment, the femto base station (femto eNB) 31 has a function of transmitting the MBMS-related information (MBMS information) to the radio terminal (UE2) 40 via the shared channel (BCCH) in response to a transmission request from the radio terminal (UE2) 40. Note that, when the radio terminal (UE2) 40 is in the active state, the femto base station (femto eNB) 31 may transmit the MBMS-related information (MBMS information) to the radio terminal (UE2) 40 via the dedicated channel (DCCH).

Therefore, even if serving to the femto base station (femto eNB) 31, the radio terminal (UE2) 40 can determine, on the basis of the MBMS-related information received from the femto base station (femto eNB) 31, which base station among the macro base stations (macro eNBs) 21 to 23 supports the intended MBMS service.

Figure 13:
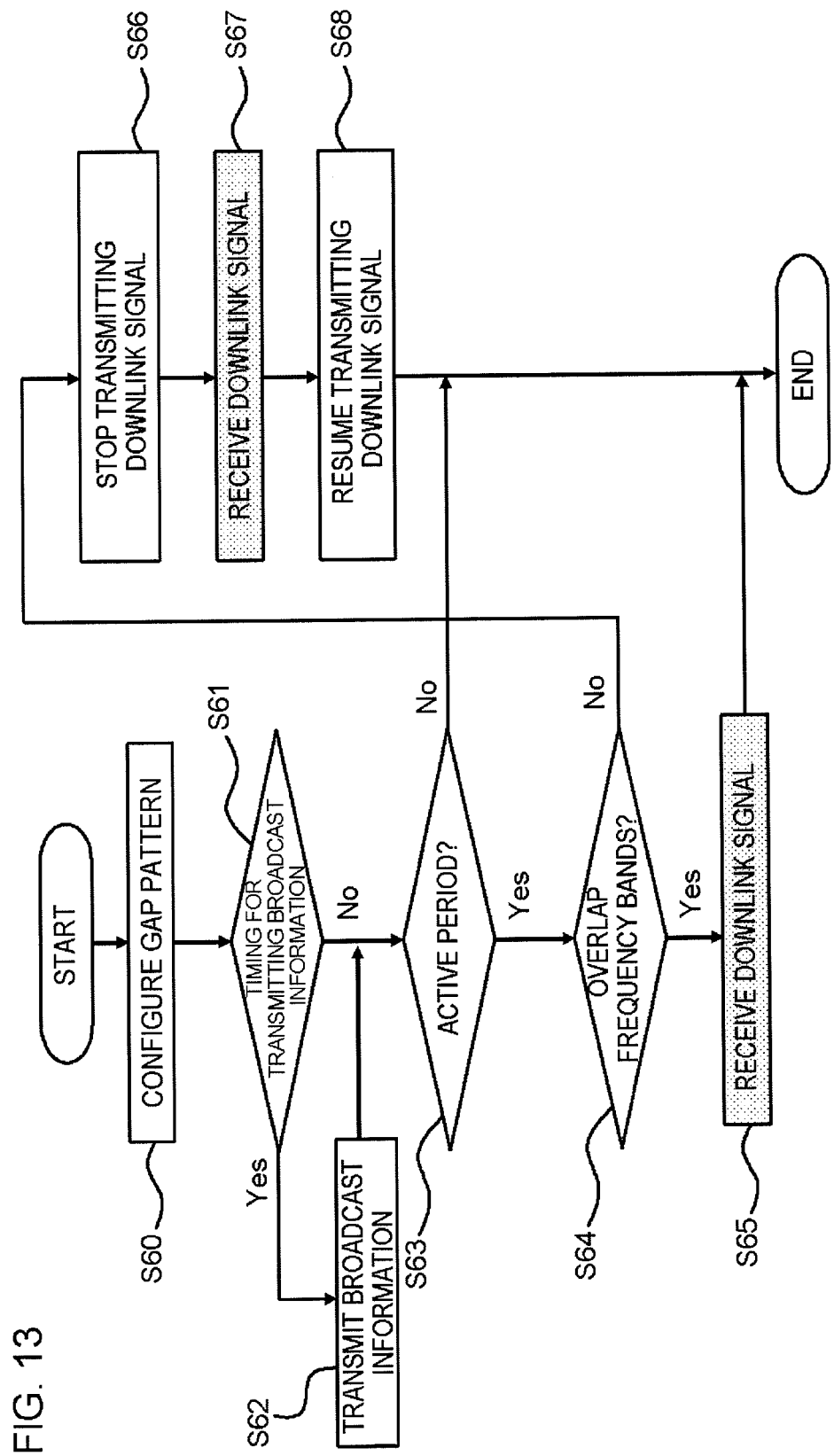
FIG. 13 is a flowchart schematically illustrating an operation procedure of the femto base station.

Next, with reference to FIG. 13, operations of the femto base station (femto eNB) 31 will be described below. FIG. 13 is a flowchart schematically illustrating an operation procedure of the femto base station 31.

As illustrated in FIG. 13, the communication control unit 52D of the femto base station 31 configures the gap pattern GP for receiving the broadcast information from the macro base station (step S60), and then, determines whether the current time corresponds to a timing for transmitting the broadcast information (step S61). If the current time corresponds to the timing for transmitting the broadcast information (YES in step S61), the broadcast information (basic information) is transmitted to the radio terminal existing in the cell of the femto base station via the BCCH (step S62).

On the other hand, if the current time corresponds to the timing for transmitting the broadcast information (NO in step S61), the communication control unit 52D determines whether the current time is in the active period in the gap pattern GP (step S63). If the current time is outside the active period in the gap pattern GP (NO in step S63), the communication control unit 52 terminates its process. Then, the communication control unit 52 executes the step S60 again if necessary.

Further, if the current time is in the active period in the gap pattern GP (YES in step S63), the communication control unit 52D determines whether a frequency band of the BCCH of the macro base stations (macro eNBs) 21 to 23 differs from that of the BCCH of the femto base station (femto eNB) 31 (step S64). If the frequency bands thereof differ (YES in step S64), the communication control unit 52D receives the uplink signal from the radio terminal existing in the cell of in the femto base station 31 by using the first receiver 51B while receiving the broadcast information ("basic information" and "MBMS information") transmitted from the macro base stations (macro eNBs) 21 to 23 via the BCCH by using the second receiver 51C. Then, the communication control unit 52D terminates its process. Thereafter, the communication control unit 52D executes the step S60 again if necessary.

On the other hand, if the frequency bands thereof are the same (NO in step S64), the communication control unit 52D temporarily stops transmitting the downlink signal (step S66). Then, the communication control unit 52D receives the downlink signal, that is, the broadcast information from the macro base stations (macro eNBs) 21 to 23 by using the second receiver 51C (step S67). Then, the communication control unit 52 resumes transmitting the downlink signal and receiving the uplink signal (step S68). After this step, the communication control unit 52D terminates its process. Then, the communication control unit 52D executes the step S60 again per need basis.

As described above, unlike the first exemplary embodiment in which the access restriction period is configured, in the second exemplary embodiment, the femto base station 31 can receive the broadcast information ("basic information" and "MBMS information") by using the second receiver 51C, whereby it is possible to perform the rapid communication control process.

In particular, in the case where the frequency band of the BCCH of the macro base stations (macro eNBs) 21 to 23 differs from that of the BCCH of the femto base station (femto eNB) 31 (YES in step S64), the communication control unit 52D receives the broadcast information from the macro base station (macro eNBs) 21 to 23 by using the second receiver 51C, whereby it is possible to reliably avoid the interference. Further, in this case, it is not necessary to stop transmitting from the femto base station (femto eNB) 31 to the radio terminal (UE2) 40.

It should be noted that, in this exemplary embodiment, the gap pattern GP is utilized for the femto base station 31 to receive the broadcast information from the macro base station. However, instead of the gap pattern GP, it may be possible to store, in a memory, the transmission timing of the BCCH from the macro base station and to use the stored timing. More specifically, the femto base station 31 may execute a process similar to the process in the active period (active gap) in the gap pattern GP described above in accordance with the transmission timing stored in the memory.

Further, in all the exemplary embodiments described above, it may be possible for the femto base station 31 to receive the control information on the MBMS transmitted via the MCCH, in addition to the MBMS-related information (MBMS information) transmitted via the BCCH from the macro base station.

Third Exemplary Embodiment

Figure 14:
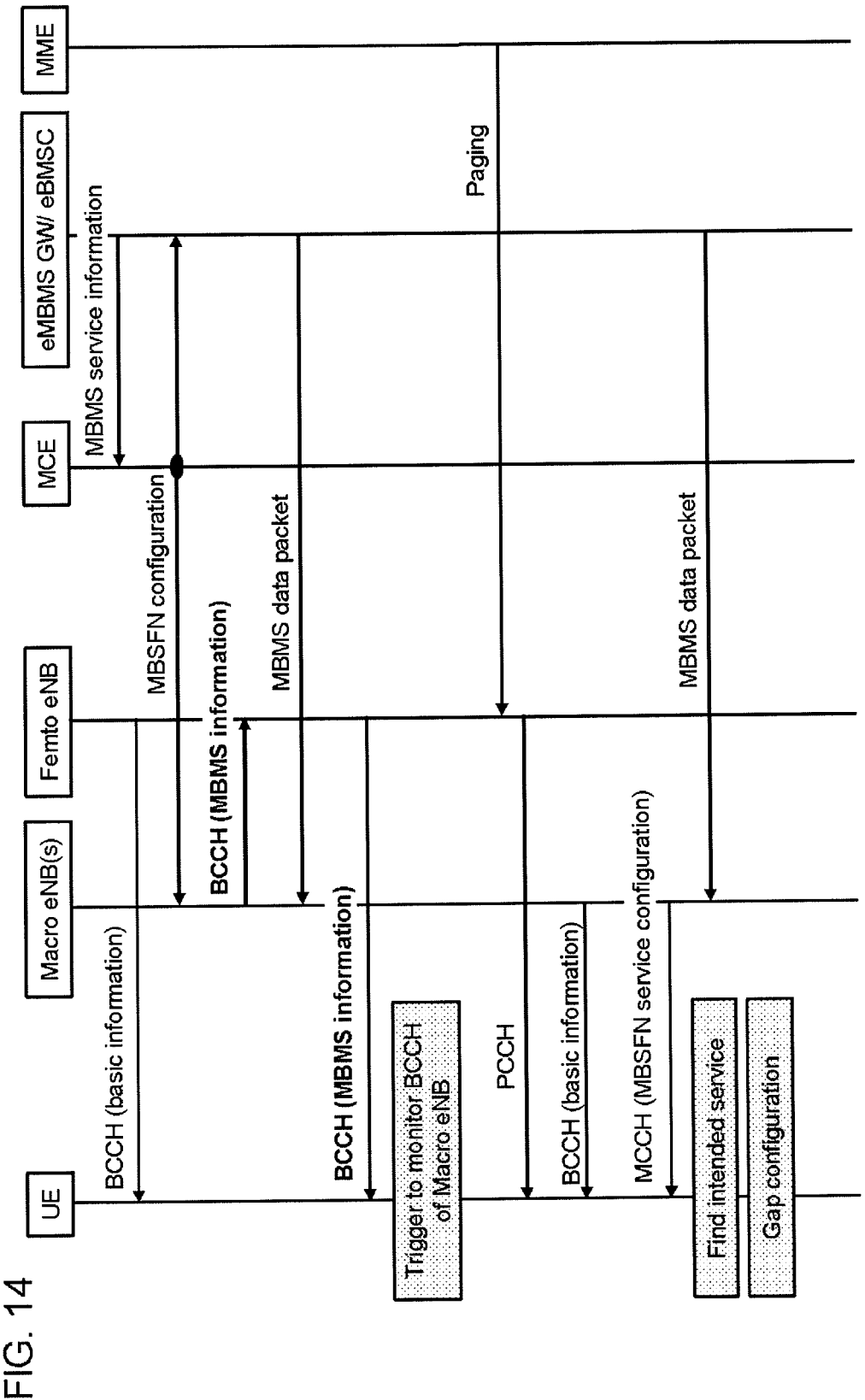
FIG. 14 is a diagram schematically illustrating a communication sequence of a wireless communication system according to a third exemplary embodiment of the present invention.

FIG. 14 is a diagram schematically illustrating a communication sequence of the wireless communication system 1 according to a third exemplary embodiment of the present invention. In the third exemplary embodiment, in accordance with the communication sequence of the first exemplary embodiment or the second exemplary embodiment, the femto base station (femto eNB) 31 receives the broadcast information ("basic information" and "MBMS information") transmitted via the BCCH from the macro base stations (macro eNBs) 21 to 23. The radio terminal (UE) 40 serves to the femto base station (femto eNB) 31, and intends to receive the contents data of the MBMS. First, as illustrated in FIG. 14, the radio terminal (UE) 40 receives the MBMS-related information (MBMS information) that the femto base station (femto eNB) 31 transmits via the BCCH.

The radio terminal (UE) 40 uses the MBMS-related information (MBMS information) as a trigger (trigger to monitor BCCH of macro eNB), and detects, on the basis of the MBMS-related information, that any of the macro base stations (macro eNBs) 21 to 23 provides a service of the MBMS.

The radio terminal (UE) 40 receives, in a manner that avoids a paging opportunity from the femto base station (femto eNB) 31, the broadcast information (basic information) that each of the macro base stations (macro eNBs) 21 to 23 transmits via the BCCH, and the MBSFN control information that each of the macro base stations (macro eNBs) 21 to 23 transmits via the MCCH.

Then, if it is detected that the intended MBMS service is provided from the macro base station (macro eNB) 21 ("Find intended service"), the radio terminal (UE) 40 configures the gap pattern GP in a manner that avoids the paging opportunity of the femto base station (femto eNB) 31 ("Gap configuration").

After that, from the macro base stations (macro eNBs) 21 to 23, the contents data are received using the gap pattern GP. More specifically, the radio terminal (UE) 40 receives signals of MBMS provided by the macro base stations (macro eNBs) 21 to 23 during the time that the gap pattern GP is in the active period (Active). On the other hand, during the time that the gap pattern GP is in the inactive period (Inactive), the radio terminal (UE) 40 receives a signal (paging message) that the femto base station 31 transmits via the PCCH. With this configuration, the radio terminal 40 can start receiving the signal by the MBSFN from the macro base station that supports the MBMS, even when the radio terminal 40 serves to the femto base station 31 that does not support the MBMS.

It should be noted that the gap pattern GP may be configured at a point in time when it is detected that any of the macro base stations (macro eNBs) 21 to 23 supports the MBMS, rather than at a point in time when the radio terminal (UE) 40 finds the intended service.

Figure 15:
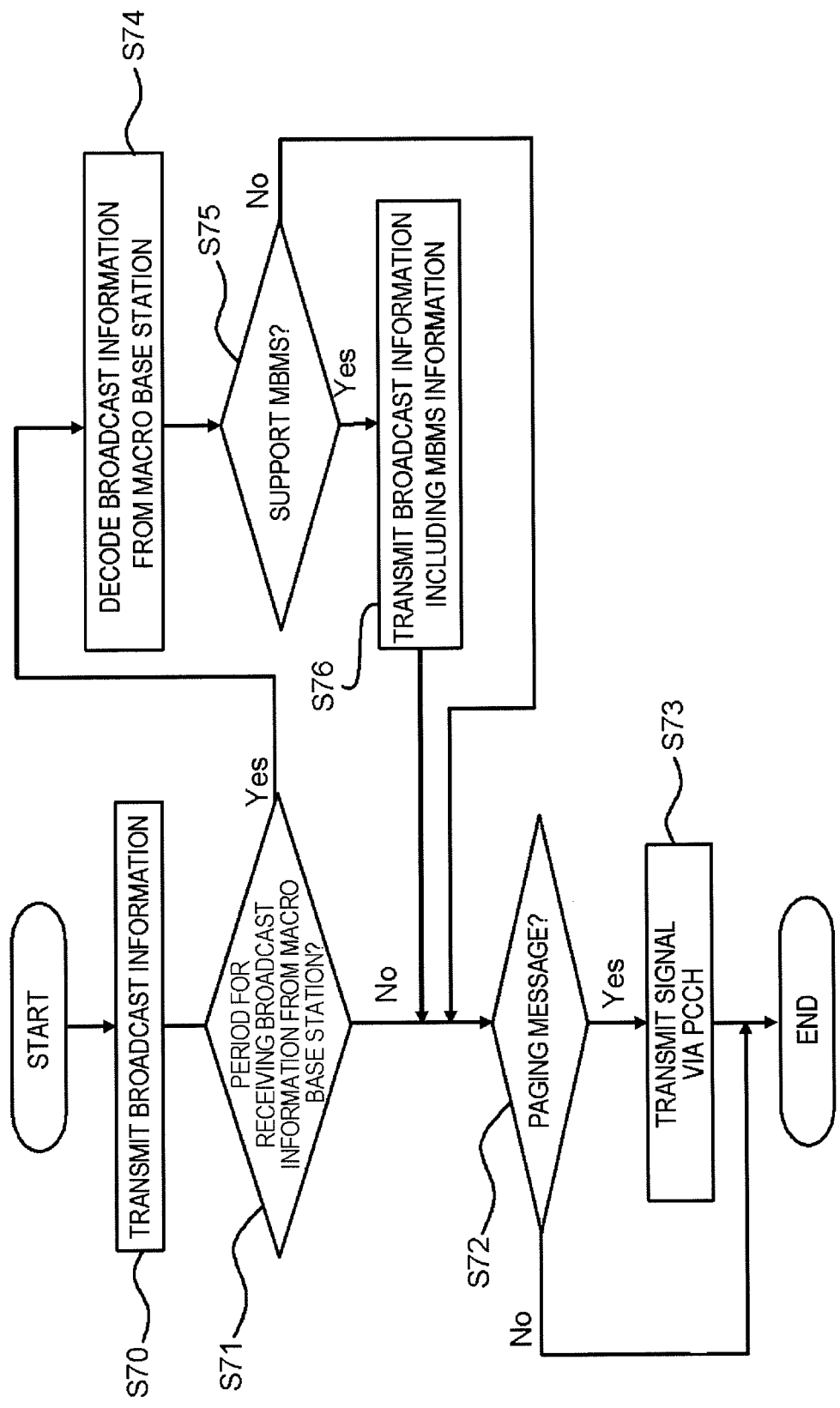
FIG. 15 is a flowchart schematically illustrating an operation procedure of the femto base station.
Figure 16:
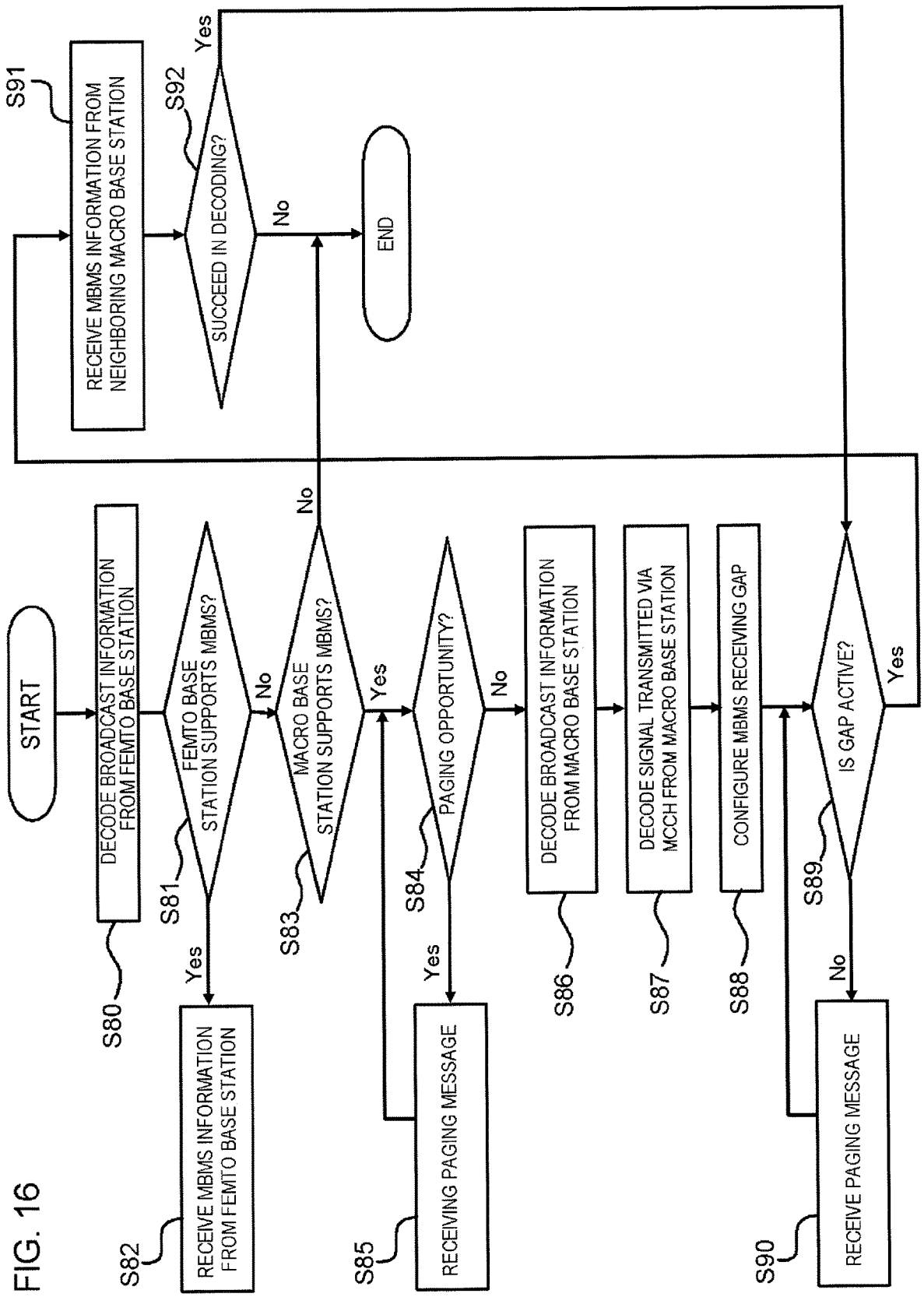
FIG. 16 is a flowchart schematically illustrating an operation procedure of the radio terminal.

Next, with reference to FIG. 15 and FIG. 16, operations of the femto base station (femto eNB) 31 and operations of the radio terminal (UE) 40 will be described below. FIG. 15 is a flowchart schematically illustrating an operation procedure of the femto base station 31, and FIG. 16 is a flowchart schematically illustrating an operation procedure of the radio terminal 40.

As illustrate in FIG. 15, the femto base station (femto eNB) 31 transmits the broadcast information (basic information) to the radio terminal existing in the cell of the femto base station 31 via the BCCH (step S70). Then, the communication control unit 52 of the femto base station (femto eNB) 31 determines whether the current time is in the period for receiving the broadcast information from the macro base stations (macro eNBs) 21 to 23 (step S71). If the current time is outside the period for receiving the broadcast information (NO in step S71) and further, there is no paging message to be transmitted (NO in step S72), the communication control unit 52 terminates its process. On the other hand, if there is the paging message to be transmitted (YES in step S72), the communication control unit 52 transmits the paging message to the radio terminal existing in the cell of the femto base station via the PCCH (step S73).

On the other hand, if the current time is in the period for receiving the broadcast information (YES in step S71), the communication control unit 52 decodes the broadcast information received from the macro base stations (macro eNBs) 21 to 23 (step S74), and determines, on the basis of the results of the decoding, whether any of the macro base stations (macro eNBs) 21 to 23 supports the MBMS (step S75). If the MBMS is supported (YES in step S75), the femto base station 31 transmits the broadcast information including the MBMS-related information (step S76), and then, transfers the process to the step S72. On the other hand, if the MBMS is not supported (NO in step S75), the femto base station 31 transfers the process to step S72.

Next, with reference to FIG. 16, operations of the radio terminal 40 will be described below.

As illustrated in FIG. 16, the receiver 41B of the radio terminal 40 first receives the broadcast information transmitted via the BCCH, and decodes the received broadcast information (step S80). Then, the communication control unit 42 determines whether the femto base station 31 that transmits the broadcast information supports the MBMS (step S81). If the femto base station 31 supports the MBMS (YES in step S81), the radio terminal 40 receives the MBMS data from the femto base station 31 to which the radio terminal 40 serves, in order to receive the service by the normal MBMS (step S82).

On the other hand, if the femto base station 31 does not support the MBMS (NO in step S81), the communication control unit 42 determines whether any of the macro base stations (macro eNBs) 21 to 23 supports the MBMS (step S83). If all the macro base stations (macro eNBs) 21 to 23 do not support the MBMS (NO in step 83), the radio terminal 40 determines that it is out of service area, and terminates the process.

On the other hand, if any one of the macro base stations supports the MBMS (YES in step S83), the communication control unit 42 calculates the paging timing for receiving the paging message, and determines, on the basis of the calculation result, whether the current time is in the paging opportunity (step S84). If the current time is in the paging opportunity (YES in step S84), the communication control unit 42 receives the paging message transmitted from the femto base station (step S85).

If the current time is outside the paging opportunity (NO in step S84), the communication control unit 42 receives the broadcast information transmitted from the neighboring macro base station to which the radio terminal does not serve, and decodes the received broadcast information (step S86), and further, the radio terminal 40 receives the signal transmitted from the macro base station via the MCCH, and decodes the received signal (step S87).

Thereafter, the communication control unit 42 configures the gap pattern GP having an active period such that it avoids including the paging opportunity, which is an opportunity for receiving the paging message from the femto base station 31 (step S88).

Next, the communication control unit 42 determines whether the gap is in the active state or inactive state, more specifically, whether the current time is in the active period Tactive or inactive period Tinactive in the gap patter GP (step S89). If the gap is in the inactive state (NO in step S89), the communication control unit 42 receives the paging message (step S90).

On the other hand, if the gap is in the active state (YES in step S89), the communication control unit 42 receives the MBMS data from the neighboring base station (step S91).

Then, if the communication control unit 42 succeeds in decoding the MBMS data (YES in step S92), the communication control unit 42 determines that the MBMS data can be successfully received, and returns its process to step S89. On the other hand, if the communication control unit 42 fails to decode the MBMS data (contents data) (NO in step S92), the communication control unit 42 determines that the radio terminal 40 is out of service area, and terminates the process. Alternatively, it may be possible to use a counter to determine that the radio terminal 40 is out of service at the time when the failure of decoding reaches N times in total or continues N times in a row (N is a positive integer).

Figure 17:
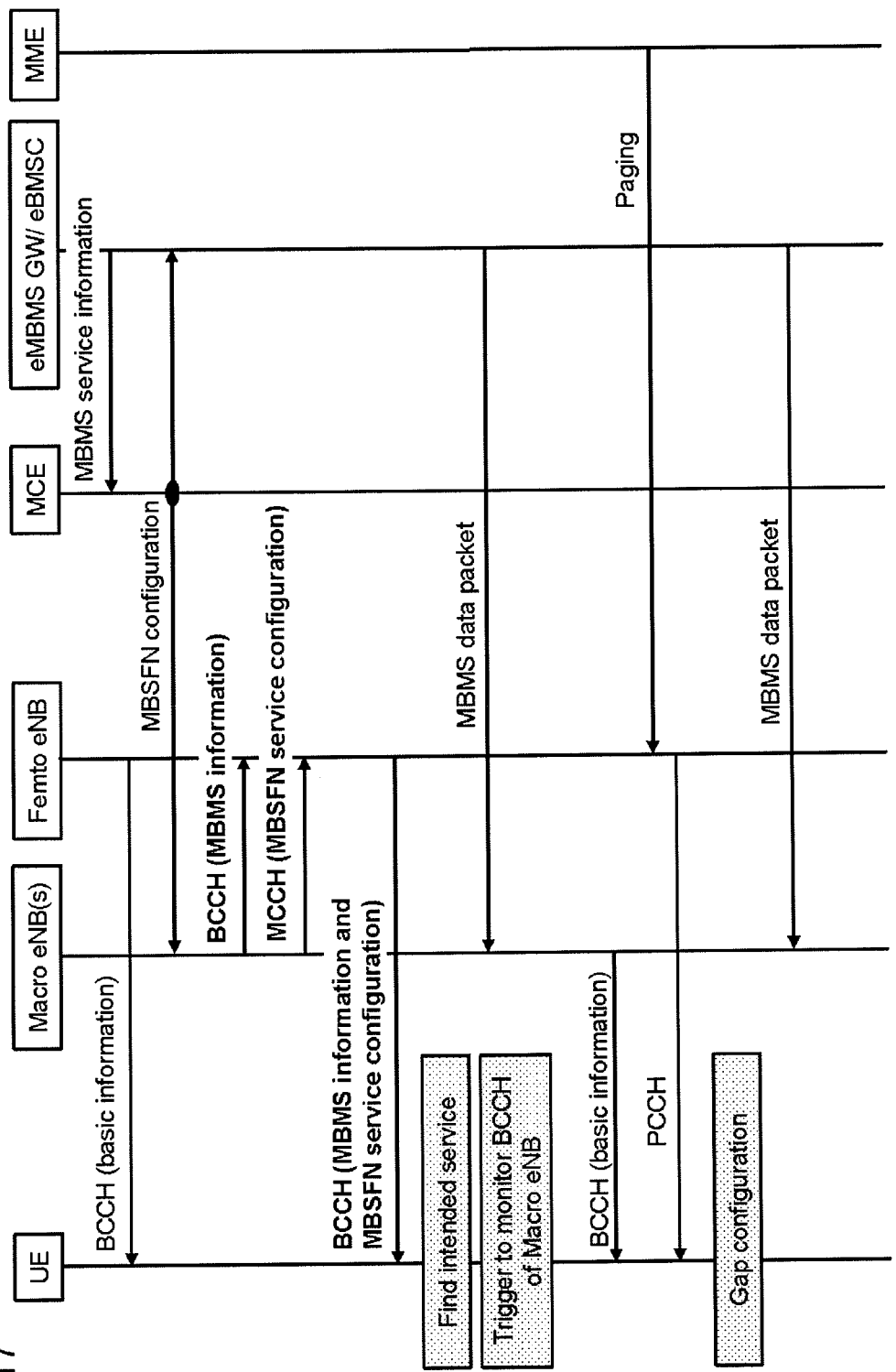
FIG. 17 is a diagram schematically illustrating a communication sequence of a modification example according to the third exemplary embodiment of the present invention.

FIG. 17 is a diagram schematically illustrating a communication sequence of a modified example of the third exemplary embodiment of the present invention. In this modified example, the femto base station (femto eNB) 31 receives, from the macro base stations (macro eNBs) 21 to 23, the MBMS-related information (MBMS information) transmitted via the BCCH as well as the MBSFN control information (MBSFN service configuration) transmitted via the MCCH, and provides the MBSFN control information to the radio terminal existing in the cell of the femto base station 31. The radio terminal (UE) 40 can obtain detailed information concerning the MBMS service (for example, type of service or list of TV programs) based on the MBSFN control information.

The radio terminal 40 receives the control information of the MBMS containing the MBSFN control information, and can detect, on the basis of this control information, whether any of the macro base stations 21 to 23 provides the intended service by the MBMS. Assuming that the intended service is provided by a macro base station, the radio terminal 40 receives the broadcast information (basic information) transmitted via the BCCH from that macro base station, and configures the gap pattern GP according to the broadcast information and the paging opportunity from the femto base station 31 to which the radio terminal serves. Then, in accordance with the gap pattern GP, the radio terminal 40 receives the paging message from the femto base station 31 and the MBMS data from the macro base station. As described above, the radio terminal 40 can receive the MBMS data from the macro base station, that is, from the source other than the femto base station 31 to which the radio terminal serves.

Fourth Exemplary Embodiment

Figure 18:
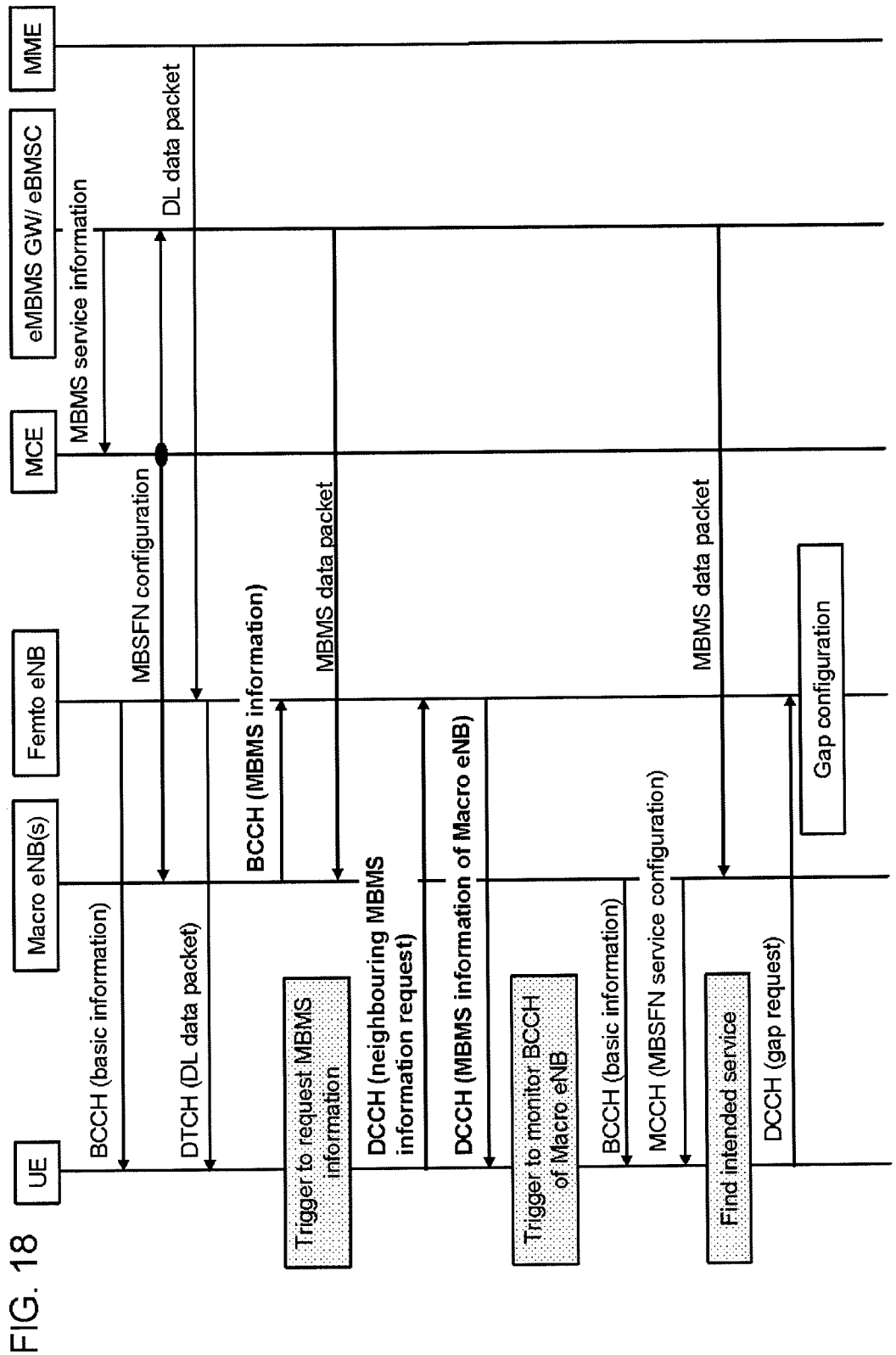
FIG. 18 is a diagram schematically illustrating a communication sequence of a wireless communication system according to a fourth exemplary embodiment of the present invention.

FIG. 18 is a diagram schematically illustrating a communication sequence of the wireless communication system 1 according to a fourth exemplary embodiment of the present invention. In the fourth exemplary embodiment, in accordance with the communication sequence of the first exemplary embodiment or the second exemplary embodiment, the femto base station (femto eNB) 31 receives the broadcast information ("basic information" and "MBMS information") transmitted via the BCCH from the macro base stations (macro eNBs) 21 to 23. The radio terminal (UE) 40, which is in the active state, serves to the femto base station (femto eNB) 31.

The radio terminal (UE) 40 performs, to the femto base station (femto eNB) 31, a request for the MBMS-related information (neighboring MBMS information request) of the neighboring cell (neighboring base station) via the DCCH (trigger to request MBMS information). In response to that, the femto base station (femto eNB) 31 transmits the MBMS-related information (MBMS information) in the macro base stations 21 to 23 to the radio terminal (UE) 40 via the DCCH, and the radio terminal (UE) 40 receives that MBMS-related information. Note that, the femto base station 31 may transmit the MBMS-related information in the neighboring cell (neighboring base station) via the BCCH instead of the DCCH. Further, even if the radio terminal (UE) 40 performs the request during the idle state, it is only necessary that the femto base station (femto eNB) 31 transmits the MBMS-related information (MBMS information) of the neighboring cell (neighboring base station) via the BCCH in response to that request.

The radio terminal (UE) 40 can detect, on the basis of the broadcast information (basic information) and the MBSFN control information (MBSFN service configuration), that any of the macro base stations (macro eNBs) 21 to 23 provides the service by the MBMS.

After that, the radio terminal (UE) 40 receives the broadcast information (basic information) transmitted from the macro base stations (macro eNBs) 21 to 23 via the BCCH and the MBSFN control information (MBSFN service configuration) transmitted from the macro base stations (macro eNBs) 21 to 23 via the MCCH during the period other than the paging opportunity from the femto base station (femto eNB) 31.

Then, in the case where it is detected that the macro base station (macro eNB) 21 provides the intended MBMS service ("Find intended service"), the radio terminal (UE) 40 requests the femto base station (femto eNB) 31 to configure the gap pattern GP. The femto base station (femto eNB) 31 configures the gap pattern GP such that an active period is set in a period other than the transmission opportunity of the downlink signal to the radio terminal (UE) ("Gap configuration"). Note that, at the time of configuring the gap pattern GP, the active period may be determined depending on frequency of transmission of the downlink signal, the mode of the service to be provided, the amount of data required for each transmission, and the like.

After that, the radio terminal receives the contents data transmitted in a manner of MBSFN from any of the macro base stations (macro eNBs) 21 to 23 using the gap pattern GP. More specifically, the radio terminal (UE) 40 receives the signal by the MBMS provided from the macro base stations (macro eNBs) 21 to 23 by the MBMS during the time when the gap pattern GP is in the active period (Active). On the other hand, during the time when the gap pattern GP is in the inactive period (Inactive), the radio terminal (UE) 40 receives the broadcast information transmitted via the BCCH from the femto base station 31, and the dedicated signal transmitted via the DCCH or DTCH. This makes it possible for the radio terminal 40 to start receiving the signal in a manner of the MBSFN from the macro base station that supports the MBMS even when the radio terminal 40 serves to the femto base station 31 that does not support the MBMS.

Further, although not illustrated in FIG. 18, the radio terminal 40 can receive, via the BCCH, the broadcast information concerning the MBMS (MBMS information) from any of the macro base station 21 to 23 when necessary.

It should be noted that the gap pattern GP may be configured at a point in time when the radio terminal (UE) 40 detects that any of the macro base stations 21 to 23 supports the MBMS, rather than at a point in time when the radio terminal (UE) 40 finds the intended service.

Figure 19:
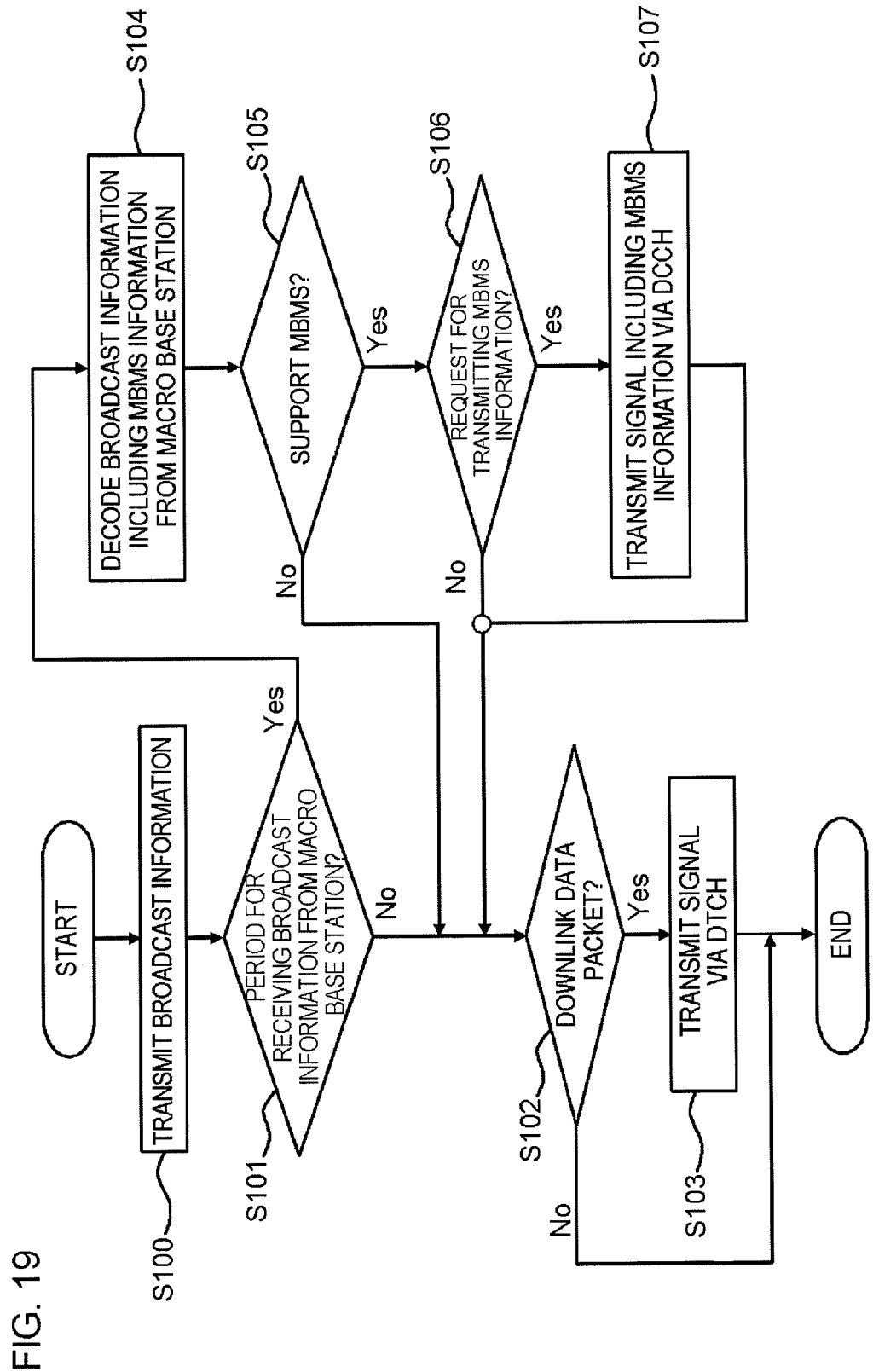
FIG. 19 is a flowchart schematically illustrating an operation procedure of the femto base station.
Figure 20:
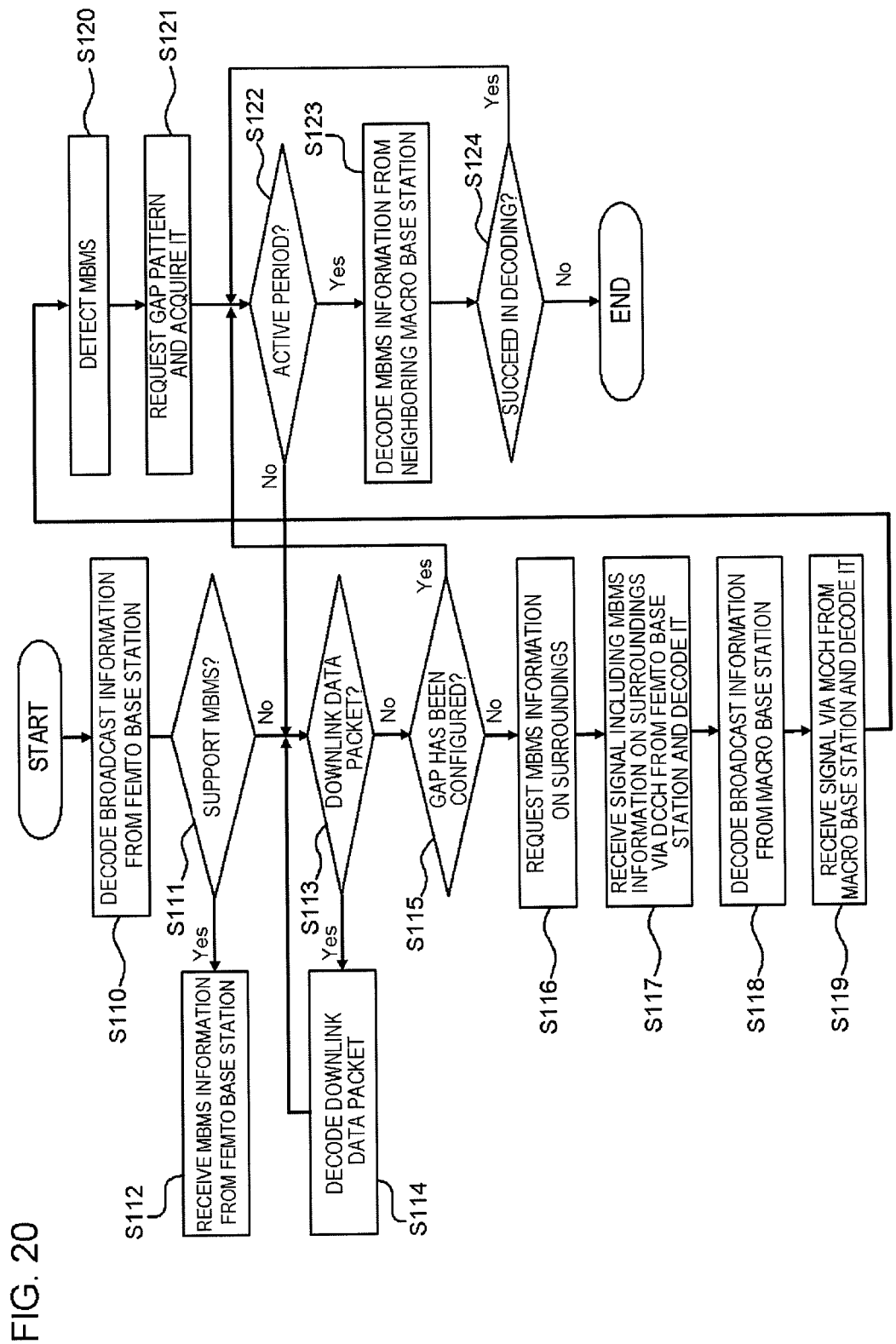
FIG. 20 is a flowchart schematically illustrating an operation procedure of the radio terminal.

Next, with reference to FIG. 19 and FIG. 20, operations of the femto base station (femto eNB) 31 and operations of the radio terminal (UE) 40 will be described below. FIG. 19 is a flowchart schematically illustrating an operation procedure of the femto base station 31, and FIG. 20 is a flowchart schematically illustrating an operation procedure of the radio terminal 40.

As illustrated in FIG. 19, the femto base station (femto eNB) 31 transmits the broadcast information (basic information) via the BCCH to the radio terminal existing in the cell of the femto base station (step S100). Then, the communication control unit 52 of the femto base station (femto eNB) 31 determines whether the current time is in the period for receiving the broadcast information from the macro base stations (macro eNBs) 21 to 23 (step S101). If the current time is outside the period for receiving the broadcast information (NO in step S101) and there is no downlink data packet to be transmitted (NO in step S102), the communication control unit 52 terminates its process. On the other hand, if there is the downlink data packet to be transmitted (YES in step S102), the communication control unit 52 transmits the signal of the downlink data packet to the radio terminal (UE) 40 via the DTCH (step S103).

If the current time is in the period for receiving the broadcast information (YES in step S101), the communication control unit 52 receives and decodes the broadcast information from the macro base stations (macro eNBs) 21 to 23 (step S104), and determines, on the basis of the results of the decoding, whether any of the macro base stations (macro eNBs) 21 to 23 supports the MBMS (step S105). If the MBMS is not supported (NO in step S105), the process transfers to step S102.

On the other hand, if the MBMS is supported (YES in step S105), upon receiving a request for transmitting the MBMS-related information of the macro cell (macro base station) (YES in step S106), the femto base station 31 transmits the MBMS-related information of the macro cell (macro base station) to the radio terminal (UE) 40 in response to the transmission request (step S107). Then, the process transfers to the step S102.

Next, with reference to FIG. 20, operations of the radio terminal 40 will be described.

As illustrated in FIG. 20, the receiver 41B of the radio terminal 40 first receives the broadcast information transmitted via the BCCH, and decodes the received broadcast information (step S110). Then, the communication control unit 42 determines whether the femto base station 31 that transmits the broadcast information supports the MBMS (step S111). If the femto base station 31 supports the MBMS (YES in step S111), the radio terminal 40 receives the MBMS data from the femto base station 31 to which the radio terminal 40 serves, in order to receive the service by the normal MBMS (step S112).

On the other hand, if the femto base station 31 does not support the MBMS (NO in step S111), the communication control unit 42 determines whether or not it receives the downlink data packet (step S113). If the communication control unit 42 receives the downlink data packet from the femto base station 31 (YES in step 113), the radio terminal 40 decodes the downlink data packet (step S114).

If the communication control unit 42 does not receive the downlink data packet from the femto base station 31 (NO in step S113), it determines whether or not the gap pattern GP is configured (step S115). If the gap pattern GP is not configured (NO in step S115), the communication control unit 42 requests the MBMS-related information of the neighboring macro base stations 21 to 23 (step S116). Then, upon receiving the MBMS-related information of the neighboring macro base station transmitted via the DCCH from the femto base station 31, the communication control unit 42 decodes the MBMS-related information (step S117).

Next, the radio terminal 40 receives and decodes the broadcast information (basic information) transmitted by the macro base station 21 to 23 via the BCCH with avoiding the paging opportunity from the femto base station 31 (step s118) and also receives and decodes the MBSFN control information (MBSFN service configuration) transmitted by the macro base stations (macro eNBs) 21 to 23 via the MCCH (step S119).

The radio terminal (UE) 40 detects, on the basis of the MBSFN control information (MBSFN service configuration), that the macro base stations (macro eNBs) 21 to 23 provide the intended service of the MBMS (step S120).

After this, the radio terminal 40 requests and obtains the gap pattern GP to/from the femto base station 31 (step S121). Then, the communication control unit 42 determines whether the gap is in the active state or inactive state, in other words, whether the current time is in the active period Tactive or in the inactive period Tinactive in the gap pattern GP (step S122). If the gap is in the inactive state (NO in step S122), the process returns to step S113.

On the other hand, if the gap is in the active state (YES in step S122), the radio terminal 40 receives and decodes the MBMS data transmitted from the neighboring macro base stations 21 to 23 (step S123). In the case where the radio terminal 40 fails to decode the MBMS data (NO in step S124), the process ends. In the case where the radio terminal 40 succeeds in decoding the MBMS data (YES in step S124), the process returns to step S122.

Figure 21:
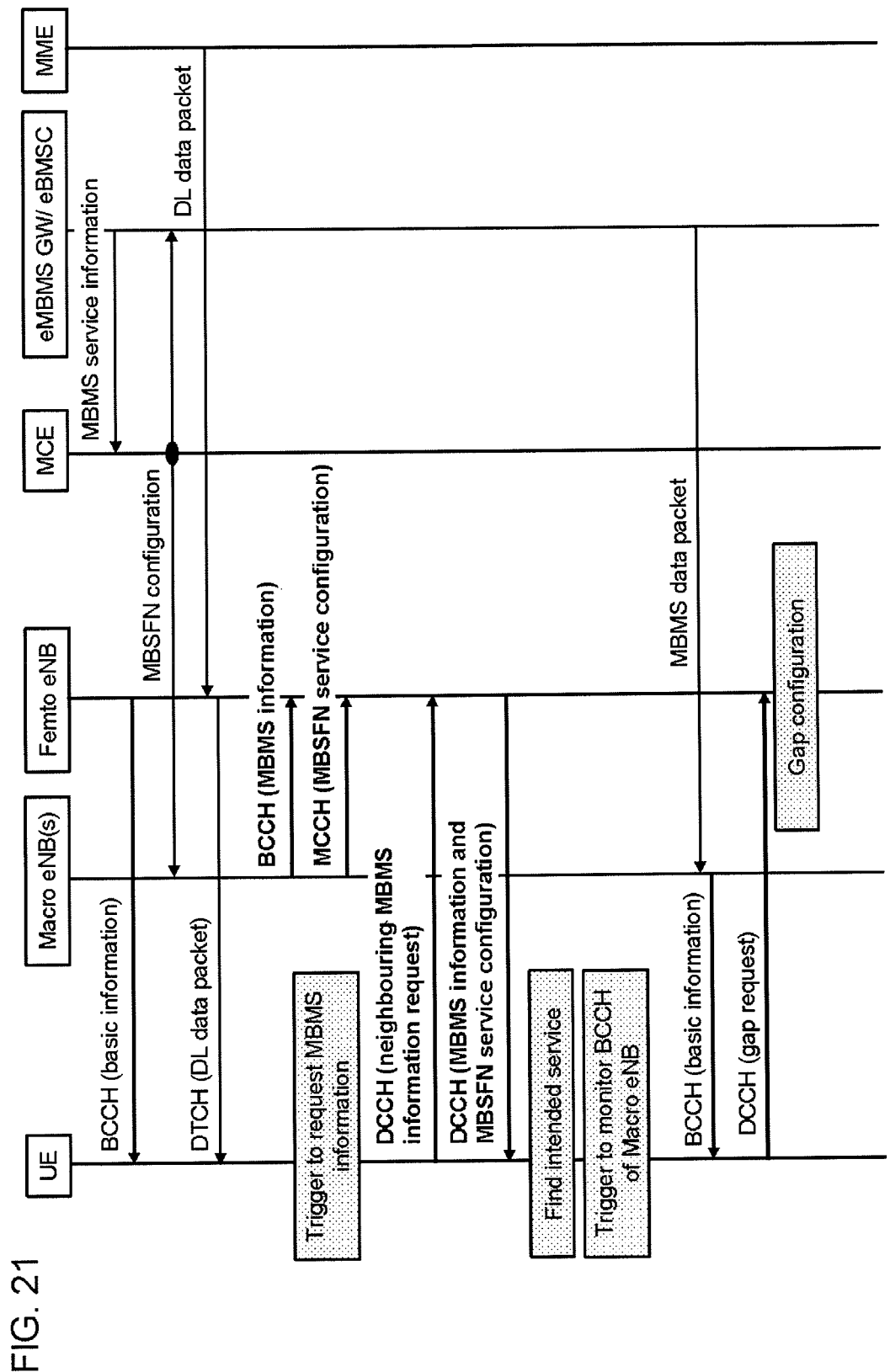
FIG. 21 is a diagram schematically illustrating a communication sequence of a modification example according to the fourth exemplary embodiment.

FIG. 21 is a diagram schematically illustrating a communication sequence of a modified example of the fourth exemplary embodiment. In this modified example, the radio terminal (UE) 40 performs, to the femto base station (femto eNB) 31, a request (neighboring MBMS information request) for the MBMS-related information in the neighboring cell (neighboring base station) via the DCCH (trigger to request MBMS information). In response to this, the femto base station (femto eNB) 31 transmits the MBMS-related information (MBMS information) concerning the macro base stations 21 to 23 as well as the MBSFN control information (MBSFN service configuration) to the radio terminal (UE) 40 via the DCCH. The radio terminal (UE) 40 can obtain detailed information concerning the MBMS service provided by the macro base stations (for example, type of service or list of TV programs) on the basis of the MBSFN control information.

Fifth Exemplary Embodiment

Figure 22:
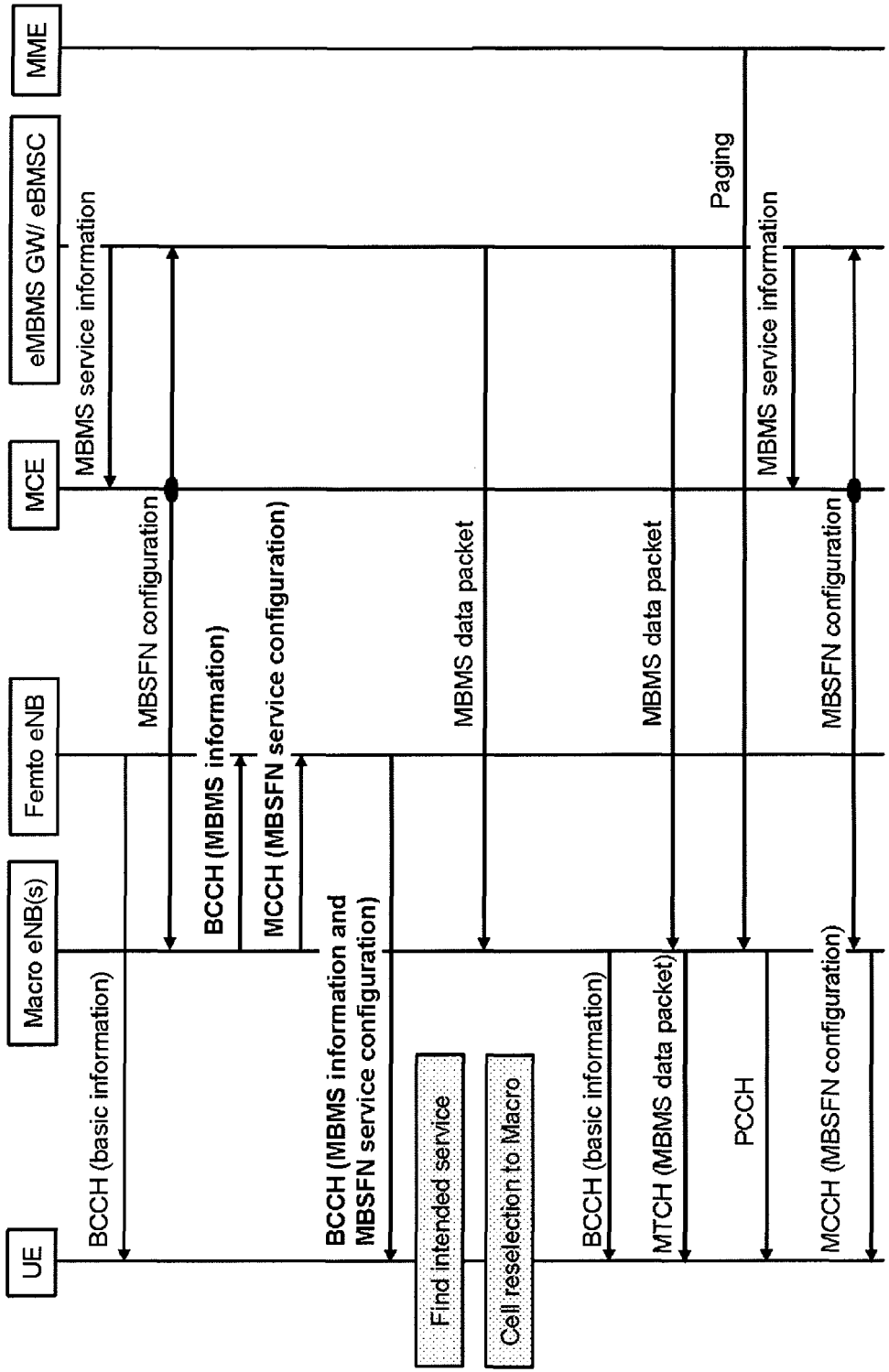
FIG. 22 is a diagram schematically illustrating a communication sequence of an example according to a fifth exemplary embodiment of the present invention.
Figure 23:
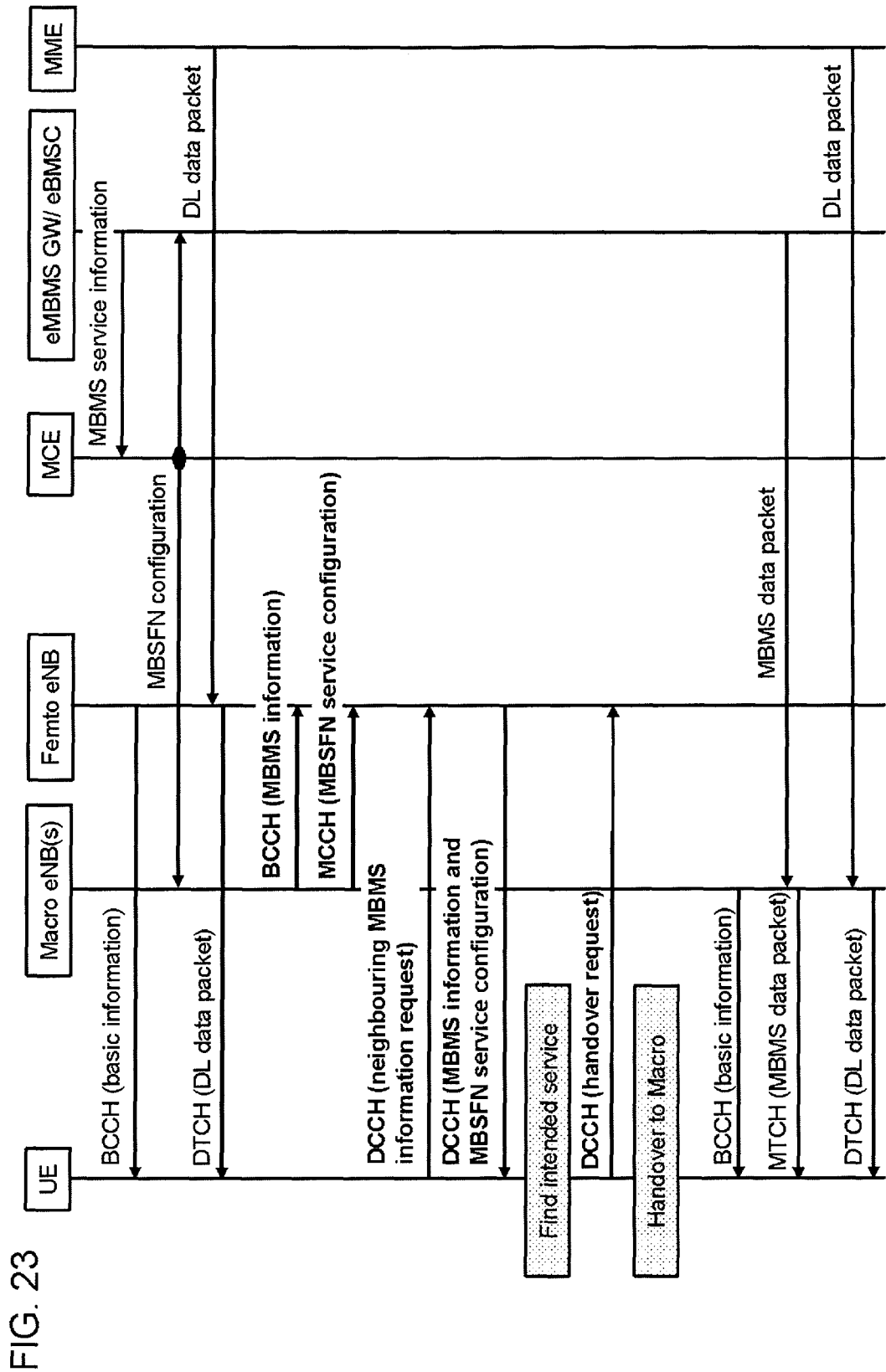
FIG. 23 is a diagram schematically illustrating a communication sequence of another example according to the fifth exemplary embodiment of the present invention.
Figure 24:
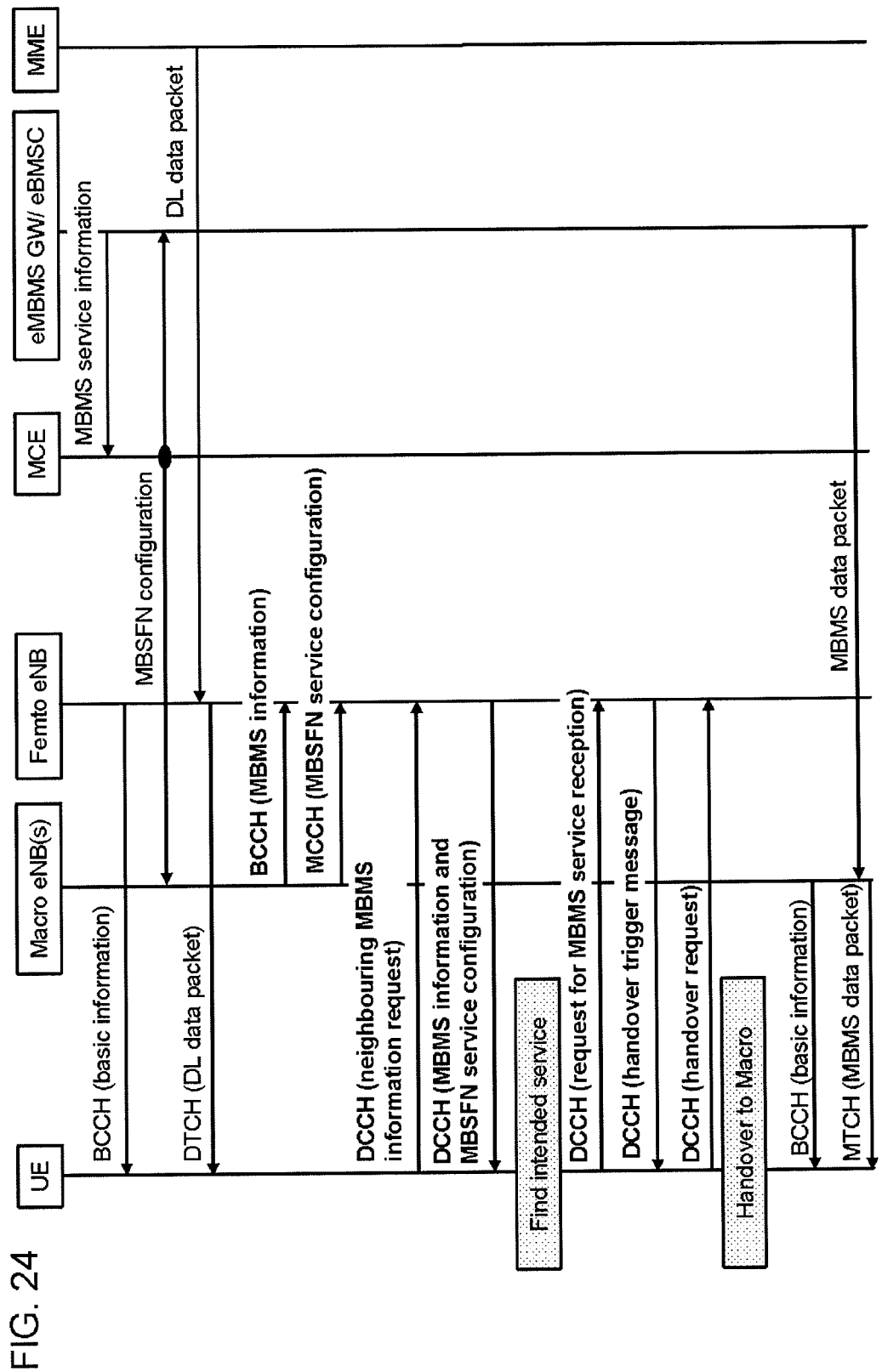
FIG. 24 is a diagram schematically illustrating a communication sequence of further another example according to the fifth exemplary embodiment of the present invention.

FIGS. 22 through 24 are diagrams each schematically illustrating a communication sequence according to a fifth exemplary embodiment of the present invention. FIG. 22 is a flowchart schematically illustrating a communication sequence of the wireless communication system 1 including the radio terminal (UE) 40 in the idle state. In this communication sequence, the radio terminal (UE) 40 receives the MBMS-related information and the MBSFN control information of the macro base stations transmitted from the femto base station 31 via the BCCH, and, determines, on the basis of the information, whether or not the MBMS service is provided from the neighboring macro base stations. If it is detected that the macro base station (macro eNB) 21 provides the intended MBMS service ("Find intended service"), the radio terminal (UE) 40 changes its serving destination from the femto base station 31 to the macro base station (macro eNB) 21 ("cell reselection to Macro"). Then, the radio terminal (UE) 40 receives the broadcast information (basic information) transmitted from the macro base station (macro eNB) 21 via the BCCH, and further receives the MBMS data packet transmitted via the MTCH.

FIG. 23 is a flowchart schematically illustrating a communication sequence of the wireless communication system 1 including the radio terminal (UE) 40 in the active state. In this communication sequence, the radio terminal (UE) 40 performs, to the femto base station 31, a request for transmitting the MBMS-related information of the neighboring cell (neighboring base station). Upon receiving the MBMS-related information and the MBSFN control information of the macro base station transmitted from the femto base station (femto eNB) 31 via the DCCH, the radio terminal (UE) 40 determines, on the basis of the information, whether or not the neighboring macro base station provides the service of the MBMS. If it is detected that the macro base station (macro eNB) 21 provides the intended MBMS service ("Find intended service"), the radio terminal (UE) 40 performs a handover request to the femto base station (femto eNB) 31, and then changes the serving destination by executing the handover from the femto base station 31 to the macro base station (macro eNB) 21 ("Handover to Macro"). Then, the radio terminal (UE) 40 receives the broadcast information (basic information) transmitted from the macro base station (macro eNB) 21 via the BCCH, and further receives the MBMS data packet transmitted via the MTCH.

FIG. 24 is a flowchart schematically illustrating a communication sequence of a wireless communication system 1 including the radio terminal (UE) 40 in the active state. In this communication sequence, the radio terminal (UE) 40 performs, to the femto base station 31, a request for transmitting the MBMS-related information of the neighboring cell (neighboring base station). Upon receiving the MBMS-related information and the MBSFN control information of the macro base station transmitted from the femto base station (femto eNB) 31 via the DCCH, the radio terminal (UE) 40 determines, on the basis of the information, whether or not the neighboring macro base station provides the MBMS service. If it is detected that the macro base station (macro eNB) 21 provides the intended MBMS service ("Find intended service"), the radio terminal (UE) 40 performs, to the femto base station (femto eNB) 31, a request that the radio terminal (UE) 40 receives the MBMS service via the DCCH (request for MBMS service reception). In response to the request, the femto base station (femto eNB) 31 transmits the handover trigger message to the radio terminal (UE) 40. Then, the radio terminal (UE) 40 performs the handover request to the femto base station (femto eNB) 31, and executes the handover from the femto base station 31 to the macro base station (macro eNB) 21 to change its serving destination ("Handover to Macro"). After this, the radio terminal (UE) 40 receives the broadcast information (basic information) transmitted from the macro base station (macro eNB) 21 via the BCCH, and further receives the MBMS data packet transmitted via the MTCH.

It should be noted that, after changing its serving destination from the femto base station 31 to the macro base station, the radio terminal (UE) 40 can receive the MBMS-related information (MBMS information) transmitted via the BCCH or the MBMS control information (MBSFN control information) transmitted via the MCCH per need basis.

The exemplary embodiments according to the present invention have been described with reference to the drawings. However, these exemplary embodiments are merely examples of the present invention, and it is possible to employ various configurations other than those described above. For example, in place of the radio terminal 40 in the exemplary embodiments described above, it is possible to employ a radio terminal having two receivers therein. In this case, the communication control unit of this radio terminal can make a first receiver receive the downlink signal such as a paging message from a radio base station to which the radio terminal serves, and make a second receiver receive the contents data from a radio base station to which the radio terminal does not serve.

The gap pattern GP is a periodic pattern consists of the inactive period in which the radio terminal 40 receives the downlink signal from a base station to which it serves, and the active period that is a period other than the inactive period, and these periods are alternately set by time. In the exemplary embodiments described above, the inactive period refers to the period in which the radio terminal 40 receives the downlink signal from the base station to which it serves, but is not limited to this. It may be possible that a period in which the radio terminal 40 receives the downlink signal from the base station to which it serves is referred to as the active period, and a period other than the active period is referred to as the inactive period.

In the first exemplary embodiment, the femto base station 31 receives the broadcast information ("basic information" and "MBMS information") transmitted from the macro base stations 21 to 23 via the BCCH only during the access restriction period, but is not limited to this. The femto base station 31 may receive the broadcast information ("basic information" and "MBMS information") transmitted from the macro base stations 21 to 23 at the time of startup of the femto base station 31.

The present application claims priority based on Japanese Patent Application No. 2008-335209 filed with Japan Patent Office (filing date: Dec. 26, 2008), all of which disclosure is incorporated herein by reference as a part of the present application.

The invention claimed is:

1. A radio communication system comprising:
   a radio base station configured to operate a cell; and
   a radio terminal belonging to the cell,
   wherein the radio base station is further configured to transmit, to the radio terminal in the cell, information of Multimedia Broadcast and Multicast Service (MBMS) served within a neighbor cell neighboring the cell,
   wherein the information of MBMS includes MBMS control information of the neighbor cell and information related to MBMS service served within the neighbor cell by MBMS Single Frequency Network (MBSFN),
   wherein the radio terminal is further configured to:
      receive the information of MBMS from the radio base station, and
      determine whether the information of MBMS includes MBMS control information and information related to MBMS service, and
   wherein the radio base station is not allowed to, and does not serve, the MBMS service within the cell.

2. The radio communication system according to claim 1, the radio communication system further comprising:
   a neighbor base station configured to multicast or broadcast the MBMS service in the neighbor cell.

3. The radio communication system according to claim 2, wherein the information of MBMS further includes MBSFN subframe information.

4. A radio terminal belonging to a cell operated by a radio base station, the radio terminal comprising:
   a receiver configured to receive, from the radio base station in the cell, information of Multimedia Broadcast and Multicast Service (MBMS) served within a neighbor cell neighboring the cell,
      wherein the information of MBMS includes MBMS control information of the neighbor cell and information related to MBMS service served within the neighbor cell by MBMS Single Frequency Network (MBSFN); and
   a processor configured to determine whether the information of MBMS includes MBMS control information and information related to MBMS service,
   wherein the radio base station is not allowed to, and does not serve, the MBMS service within the cell.

5. The radio terminal according to claim 4, wherein a neighbor radio base station multicasts or broadcasts the MBMS service in the neighbor cell.

6. The radio terminal according to claim 5, wherein the information of MBMS further includes MBSFN subframe information.

7. A method performed by a radio terminal belonging to a cell operated by a radio base station, the method comprising:
   receiving, from the radio base station in the cell, information of Multimedia Broadcast and Multicast Service (MBMS) served within a neighbor cell neighboring the cell,
      wherein the information of MBMS includes MBMS control information of the neighbor cell and information related to MBMS service served within the neighbor cell by MBMS Single Frequency Network (MBSFN; and
   determining whether the information of MBMS includes MBMS control information and information related to MBMS service,
   wherein the radio base station is not allowed to, and does not serve, the MBMS service within the cell.

8. The method according to claim 7, wherein a neighbor radio base station multicasts or broadcasts the MBMS service in the neighbor cell.

9. The method according to claim 8, wherein the information of MBMS further includes MBSFN subframe information.

* * * * *

UNITED STATES PATENT AND TRADEMARK OFFICE
CERTIFICATE OF CORRECTION

PATENT NO. : 10,638,454 B2
APPLICATION NO. : 15/985851
DATED : April 28, 2020
INVENTOR(S) : Hisashi Futaki and Jinsock Lee It is certified that error appears in the above-identified patent and that said Letters Patent is hereby corrected as shown below:

Column 17, Description of Embodiments, Line 49; After "(UE)", insert --40--

Signed and Sealed this
Fourteenth Day of July, 2020

Andrei Iancu
*Director of the United States Patent and Trademark Office*